United States Patent
Schneider et al.

(10) Patent No.: US 6,650,650 B1
(45) Date of Patent: Nov. 18, 2003

(54) METHOD AND APPARATUS FOR TRANSMITTING VOICE DATA OVER NETWORK STRUCTURES

(75) Inventors: Neal Schneider, Sunnyvale, CA (US); Gary Tsztoo, Saratoga, CA (US)

(73) Assignee: UT Starcom, Inc., Alameda, CA (US)

( * ) Notice: Subject to any disclaimer, the term of this patent is extended or adjusted under 35 U.S.C. 154(b) by 0 days.

(21) Appl. No.: 09/397,468

(22) Filed: Sep. 16, 1999

(51) Int. Cl.[7] .............................................. H04L 12/56
(52) U.S. Cl. ...................................... 370/412; 370/473
(58) Field of Search ................................ 370/470, 473, 370/351, 389, 392, 395.21, 395.3, 395.64, 395.65, 395.7, 395.71, 395.72, 412, 413, 464, 468, 475

(56) References Cited

U.S. PATENT DOCUMENTS

| | | | | |
|---|---|---|---|---|
| 5,367,643 A | * | 11/1994 | Chang et al. ................. 710/62 |
| 5,477,541 A | * | 12/1995 | White et al. ................. 370/392 |
| 5,802,050 A | * | 9/1998 | Petersen et al. ............. 370/394 |
| 5,898,688 A | * | 4/1999 | Norton et al. ............... 370/362 |
| 5,905,727 A | * | 5/1999 | Christensen et al. ..... 370/395.3 |
| 5,910,954 A | * | 6/1999 | Bronstein et al. ........... 370/401 |
| 5,982,749 A | * | 11/1999 | Daniel et al. ................ 370/253 |
| 6,088,777 A | * | 7/2000 | Sorber ........................ 711/171 |
| 6,201,813 B1 | * | 3/2001 | Klausmeier et al. ........ 370/412 |
| 6,226,264 B1 | * | 5/2001 | Shibata et al. .............. 370/232 |
| 6,272,128 B1 | * | 8/2001 | Pierson, Jr. ................. 370/352 |
| 6,356,545 B1 | * | 3/2002 | Vargo et al. ................. 370/355 |
| 6,389,038 B1 | * | 5/2002 | Goldberg et al. ........... 370/471 |
| 6,430,196 B1 | * | 8/2002 | Baroudi ....................... 370/466 |
| 6,463,082 B2 | * | 10/2002 | Bergenwall et al. ........ 370/535 |
| 6,477,164 B1 | * | 11/2002 | Vargo et al. ................. 370/356 |
| 2002/0012334 A1 | * | 1/2002 | Strawczynski et al. ..... 370/337 |

OTHER PUBLICATIONS

The ATM Forum. "Traffic Management Specification Version 4.0". Apr. 1996.*
Sriram, Kotikalapudi et al. "Voice Packetization and Comression in Broadbend ATM Networks". Selected Areas of Communications, IEEE Journal. vol. 9, Issue 3. Apr. 1991.*
Garrett, Mark et al. "Joint Source/Channel Coding Statistically Multiplexed Real–Time Services on Packet Networks". Networking IEEE/ACM Transactions. vol. 1, Issue 1. Feb. 1993.*

* cited by examiner

Primary Examiner—Melvin Marcelo
Assistant Examiner—Derrick W. Ferris
(74) Attorney, Agent, or Firm—Bradley T. Sako; Felix L. Fischer

(57) ABSTRACT

According to one embodiment, a system (100) can include a number of processor subsystems (102-0 to 102-3) that can receive voice data samples from a network structure (NET A) and store the voice data samples in corresponding channel memories (120-0 to 120-3). Information for the voice data samples, including address locations, can be included in bin linked-lists (126-0 to 126-3). Bin linked-lists (120-0 to 120-3) can allow voice data samples in different channel memories (120-0 to 120-3) to be transmitted in a single multiplexed network voice packet.

19 Claims, 13 Drawing Sheets

Application Serial 09/397,468
Title: Method and Apparatus for Transmitting Voice Data Over Network Structures

```
Initialization:
for (i=0; i<total_number_of_calls; i=i+1)
{ if (call[i].priority = bin[x].priority) // check if there is a priority match between call [i] and any bin[x]
    {total_number_of_bins = total_number_of_bins+1; // if no match create new bin
    create_bin
    bin[i].priority=call.priority;
    bin[i].lmax=lmax[priority];
    bin[i].pmax=pmax[priority];
    bin[i].lmax_base=lmax[priority];
    bin[i].pmax_base=pmax[priority];
}
else if ((bin[x].bin_size + call[i].sample_size) > bin[x].pmax) create_bin
                                    //if matched bin[x] is full, create new bin
else { // if matched bin[x] has room, add new voice data "call" to bin
    call[i].bin_number = x;
    bin[x].number_of_calls = bin[x].number_of_calls + 1;
    bin[x].bin_size = bin[x].bin_size + call[x].sample_size;
} for (i=0; i<total_number_of_calls; i=i+1) // determine expected efficiency for each bin
    bin[i].expected_efficiency = f(bin[i].lmax, bin[i].pmax, bin[i].number_of_calls,
        bin[i].average_sample_size);

Adaptive Feedback:
if (bandwidth_consumed / total_bandwidth) > maximum_utilization) // network congested?
    for (i=0; i<total_number_of_calls; i=i+1)
        {bin[i].pmax= bin[i].pmax * pmax[i].congestion_rate;
         bin[i].lmax= bin[i].lmax * lmax[i].congestion_rate;
}
else if ((bandwidth_consumed / total_bandwidth) < minimum_utilization) // network starved?
    {bin[i].pmax= bin[i].pmax * pmax[i].starvation_rate;
     bin[i].lmax= bin[i].lmax * lmax[i].starvation_rate;
}
else // network normal for (i=0; i<total_number_of_calls; i=i+1)
{
if (bin[i].efficiency << bin[i].expected_efficiency) // if inefficient, slowly adjust back to expected efficiency
    bin[i].lmax = bin[i].lmax * (2 - lmax[i].settle_rate);
}

// otherwise slowly adjust back to assumed base latency and size
for (i=0; i<total_number_of_calls; i=i+1)
{
    if (bin[i].pmax >> bin[i].pmax_base) bin[i].pmax = bin[i].pmax * pmax[i].settle-rate;
    if (bin[i].pmax << bin[i].pmax_base) bin[i].pmax = bin[i].pmax * (2-pmax[i].settle-rate);
    if (bin[i].lmax >> bin[i].lmax_base) bin[i].lmax = bin[i].lmax * lmax[i].settle-rate;
    if (bin[i].lmax << bin[i].lmax_base) bin[i].pmax = bin[i].pmax * (2-lmax[i].settle-rate);
}
```

FIG. 6A

| | |
|---|---|
| call | an established link for a voice data sample |
| call.priority | the priority assigned to a call based on QoS |
| call.sample_size | the size of each voice data sample from a particular call |
| call.bin_number | the number of the bin in which the call will placed when multiplexed |
| total_number_of_calls | the total number of calls |
| bin | an established multiplexed session between two systems |
| bin.priority | the priority assigned to a particular bin, associated with the priority of its calls |
| bin.bin_size | the current size of a bin |
| bin.lmax | the *lmax* associated with a particular bin (see *lmax* below) |
| bin.pmax | the *pmax* associated with a particular bin (see *pmax* below) |
| bin.number_of_calls | total number of calls associated with a specific bin |
| bin.average_sample_size | the average *call.sample_size* of all members of a particular bin |
| total_number_of_bins | the total number of active bins in a system |
| lmax | the maximum latency a bin will wait before being transmitted |
| pmax | the maximum size a bin is allowed to grow before being transmitted |
| lmax_base | original assumed *lmax* for a particular bin and associated QoS |
| pmax_base | original assumed *pmax* for a particular bin and associated QoS |
| lmax.starvation_rate | positive or negative rate of change for a specific *lmax* under starving network conditions |
| pmax.starvation_rate | positive or negative rate of change for a specific *pmax* under starving network conditions |
| lmax.congestion_rate | positive or negative rate of change for a specific *lmax* under congested network conditions |
| pmax.congestion_rate | positive or negative rate of change for a specific *pmax* under congested network conditions |
| pmax.settle_rate | rate of change for a specific *pmax* when settling down from an increased value |
| lmax.settle_rate | rate of change for a specific *lmax* when settling down from an increased value |
| (2 - pmax.settle_rate) | rate of change for a specific *pmax* when settling down from a decreased value |
| (2 - lmax.settle_rate) | rate of change for a specific *lmax* when settling down from a decreased value |
| total_bandwidth | total amount of bandwidth that an outgoing network structure can provide |
| bandwidth_consumed | total amount of bandwidth being consumed on an outgoing network structure |
| bandwidth_available | total amount of bandwidth available on an outgoing network structure |
| maximum_utilization | a % value high watermark indicating network congestion |
| minimum_utilization | a % value low watermark indicating network starvation |
| bin.expected_efficiency | a % value of the expected average efficiency of a bin |
| bin.efficiency | a % value indicating the average efficiency of a bin |

FIG. 6B

METHOD AND APPARATUS FOR TRANSMITTING VOICE DATA OVER NETWORK STRUCTURES

TECHNICAL FIELD

The present invention relates generally to network structures, and more particularly to a network apparatus and method for transmitting voice data from multiple channels in a multiplexed voice data packet.

BACKGROUND OF THE INVENTION

Network systems typically transmit data from one network location (a source location) to another network location (a destination location) by first placing the data into "packet" form. A packet can include information that allows a data packet to be directed from one network location to another by including certain information, including a "destination address," that identifies a destination location. Such packet identifying information is typically placed in an initial portion of the packet, often referred to as a "header." The header will include a number of fields, each of which includes a particular type of packet information. The data carried by the packet is often referred to as a "payload." The process of generating packets from data is often referred to as "packetization." In particularly large networks, packet data can be transferred from a source location to a destination location by way of one or more network nodes. A transmission from one node to the next can be referred to as a "hop."

One particular type of network data that can be desirable is voice data. One approach to transmitting voice data over a network structure is referred to generally as "voice over Internet Protocol" ("VoIP"). Internet Protocol (IP) is one particular protocol for transmitting data over a network structure having devices that recognize the IP protocol. The wide reach of the Internet and wide use of IP in smaller networks makes VoIP an important application. VoIP can enable a local network, such as that shared by a corporation, to carry voice communications between the various users in addition to conventional sharing of data and/or applications.

Because most connections to the Internet are by way of a conventional telephone line or a higher speed connection (an integrated services digital network (ISDN), a "T-3" or "T-1" trunk line, or one of the many types of digital subscriber lines (xDSL), as just a few examples) the use of VoIP can provide long distance voice communications at considerable cost savings by avoiding the toll charges required by conventional long distance telephone calls. VoIP can prove extremely valuable to the telecommuter, as data and voice can both be transmitted to and from an office, allowing efficient communication between the remote worker and other on-site workers.

Another advantage of VoIP is the ability to transmit the same data packets to multiple destinations. This enables teleconferencing to occur over very large distances, again, without the unwanted expense of a conventional long distance telephone service provider.

Network structures can be "connectionless," "connection oriented," or some hybrid thereof. A connectionless structure provides a more flexible and robust network. Data paths between different points can vary according to available network resources. For example, a first data packet may be transmitted from a source location to a destination through a first series of hops, while a second data packet transmitted between the same two points could be transmitted by way of a different number of hops, by way of a separate set of nodes. In this arrangement, if a node becomes disabled, data can still be transmitted between two points. In this way, VoIP is particularly advantageous, as the transmitting structure is more robust.

One disadvantage to conventional approaches that transmit voice data over a connectionless structure is that transmitting too much data from a source location at a given time may result in too much latency (delay) in the voice data.

In contrast, a connection oriented network structure may seek to establish a dedicated path between two network points. Such network approaches include asynchronous transfer mode (ATM) switching and "IP" Switching. Such approaches can ensure "quality of service" (QoS) by ensuring sufficient resources exist in the dedicated path to prevent voice data from being unduly delayed. A drawback to connection-oriented network structures is that such approaches are usually more expensive, and can require more complex devices. In addition, setting up the initial dedicated path can introduce a further initial delay. Further, connection-oriented network structures can be more susceptible to failure in the event one or more of the nodes are disabled.

The transmission of voice data over the Internet is also referred to as "Internet Telephony" and can employ systems referred as "IP Phones." It is expected that Internet Telephony will be a very important application for the Internet.

As noted above, a particular concern that arises out the transmission of voice data over a network structure is that of latency (delay). For example, for most data, some delay can be acceptable. Whether or not text and/or images are not immediately viewable may be of less concern than if the text and/or images are corrupted. Accordingly, many transmission protocols are more concerned with reassembling data in the proper order, and less concerned with the overall rate at which the data is transmitted. As just one example, a data file that is broken down into packets that are transmitted in a particular order, may receive the packets in a different order, and subsequently reassemble them in the correct order.

Voice data can be more susceptible to latency effects. As just one example, attempting to have a conversation over a data network can be extremely awkward when undue delay is introduced into the transmission of the voice data. The natural flow of conversation is often interrupted as a delay may be misinterpreted as the end of one person's conversation. Further, if data is lost, or multiple packets take too long to reassemble, speech can be broken up, with portions of the conversation being dropped.

Another concern in voice data over networks is the "random" or "asynchronous" nature of voice data. That is, if multiple parties are having multiple conversations, voice data may "bog down" a system, as the rate at which voice data is being received can exceed the rate at which a system can transmit the data (exceed the bandwidth of the system). This can be of particular concern when multiple speakers exist on a system that is connected via a high speed line to the Internet, or some other higher level network structure.

Conversely, another concern in voice over data networks can be efficiency. While it is desirable to provide a predetermined latency for voice data, it would be advantageous to take advantage of any extra available network bandwidth.

One approach to voice over data networks is the personal computer (PC) Internet phone or Internet videophone. Such approaches typically involve utilizing the microphone and sound card of a PC in conjunction with proprietary software. The central processing unit (CPU) of the PC, in conjunction with an analog-to-digital converter (typically in the sound card), converts the voice signal into digital form, and then transmits the data in a conventional fashion as a series of packets. A drawback to such approaches is that such systems provide a solution for only one voice data source, and must rely on conventional connectionless and/or connection oriented structures voice the transmission of the voice data. Hence, voice data can be unreliable, expensive, and/or incur unwanted latency.

Another approach to transmitting voice data over a structure can involve providing a conventional voice "gateway" to a larger network structure (such as the Internet). Such a conventional gateway can receive voice data from a number of different channels, and transmit the voice data onto the larger network structure. Such approaches may not be as efficient as desired. For example, the amount of voice data transmitted may be less than or greater than what the network is capable of handling.

One particular format for network data is a "multiplexed" packet. A multiplexed packet payload can include a number of smaller payloads that can be processed differently. A multiplexed packet can thus include a typical header, and then also include a number of smaller multiplexer headers for the smaller payloads.

It would be desirable to provide a system that can transmit multiplexed voice packets according to predetermined latency limits.

It would also be desirable to arrive at some way of transmitting voice data in multiplexed packets that can utilize the available bandwidth of a network in an efficient manner.

It would also be desirable to provide a system that can rapidly store incoming voice data from different locations, and then transmit the various voice data in a multiplexed voice data packet.

It would also be desirable to provide a system that can transmit voice data in multiplexed packet form at various quality or service (QoS) levels.

SUMMARY OF THE INVENTION

According to the disclosed embodiments of the present invention, out-going voice packet data, originating from a number of different sources, can be stored in a buffer memory. Voice data can be transmitted from the buffer memory in simplex or multiplexed packet form. Multiplexed voice packet data can be transmitted within a predetermined latency value by transmitting multiplexed voice packet data according to packet size and/or voice data latency values.

According to another aspect of the embodiments, the efficiency of multiplexed voice data transmission can be dynamically adapted to network conditions, such as increased bandwidth or decreased bandwidth.

According to one aspect of the embodiments, voice data for the same multiplexed voice packet can be grouped together (binned) in the buffer memory according to predetermined criteria. One such criterion can include common destination.

According to another aspect of the embodiments, voice data that is to be binned, can be accumulated at various locations within a buffer memory. Voice data that is to be commonly binned can be linked together by a stored location list (linked-list). The linked-list can be used to transmit the binned voice data as a multiplexed voice packet.

According to another aspect of the embodiments, a buffer memory that stores voice channel data for an out-going multiplexed voice packet can include a static random access memory for advantageously fast access to the voice data.

According to another aspect of the embodiments, as voice data is accumulated for a given bin, a bin size is recalculated. The bin size and a data transmit rate (such as a bandwidth) can be used to determine when to transmit binned data to meet a general latency value.

According to another aspect of the embodiments, voice data can be accumulated for multiple bins. The size of multiple bins and a data transmit rate can be used to determine when to transmit bin data, and provide transmit priority to particular bins.

According to another aspect of the embodiments, multiplexed voice data can be transmitted for bin according to a "dump" signal. The dump signal can be generated by using the transmitting speed and current amount of data stored for a bin to generate a transmit latency value. The transmit latency value can reflect the amount of time remaining before the currently stored voice data can be transmitted.

According to another aspect of the embodiments, a transmit latency value is subtracted from a maximum latency value to generate a count value. The count value reflects how much time remains before the stored voice data must be transmitted in order to ensure a maximum latency value for the transmitted voice data.

According to another aspect of the embodiment, a count value may be a value that is initially preset to a predetermined value. A count value may then be changed according to network conditions.

According to another aspect of the embodiments, a count value can be decremented according to the rate at which multiplexed voice data can be transmitted.

According to another aspect of the embodiments, as additional voice data is accumulated for a bin, a new transmit latency value can be generated.

According to another aspect of the embodiments, voice data stored for a bin includes voice data from a number of different sources (channels). When the number of different channels for a bin exceeds a predetermined value, voice data for the bin can be transmitted.

According to another aspect of the embodiments, the current amount of voice data stored for multiple bins can be modified and summed to generate a total latency value. When the total latency value is greater than a count value for a bin, the voice data for the bin can be transmitted.

According to another aspect of the embodiments, voice data bins can be assigned a particular quality of service value. Voice data can be transmitted from a bin to provide the quality of service.

According to another aspect of the embodiments, as transmitting bandwidth decreases, bin size and/or latency values can be decreased.

According to another aspect of the embodiments, as transmitting bandwidth is available, bin size and/or latency values can be increased.

According to another aspect of the embodiments, a bin can have a base bin size and latency value. If transmitting bandwidth is in a nominal range, a current bin size and latency value can be adjusted to approach the base bin size and latency value.

According to another aspect of the embodiments, a bin can have a static size. The contents of the bin can be periodically transmitted according to a synchronous transmission rate.

BRIEF DESCRIPTION OF THE DRAWINGS

FIGS. 6A and 6B is another example of a QoS method.

DETAILED DESCRIPTION OF THE EMBODIMENTS

Various embodiment of the present invention will now be described in conjunction with a number of block diagrams, schematic diagrams, and flow diagrams. The various embodiments set forth systems and methods that can accumulate voice data from multiple sources (voice channels). Accumulated voice data can be organized ("binned") according to criteria, such as a common destination. Binned data can then be transmitted in a multiplexed packet according to predetermined latency criteria.

First Embodiment

Figure 1:
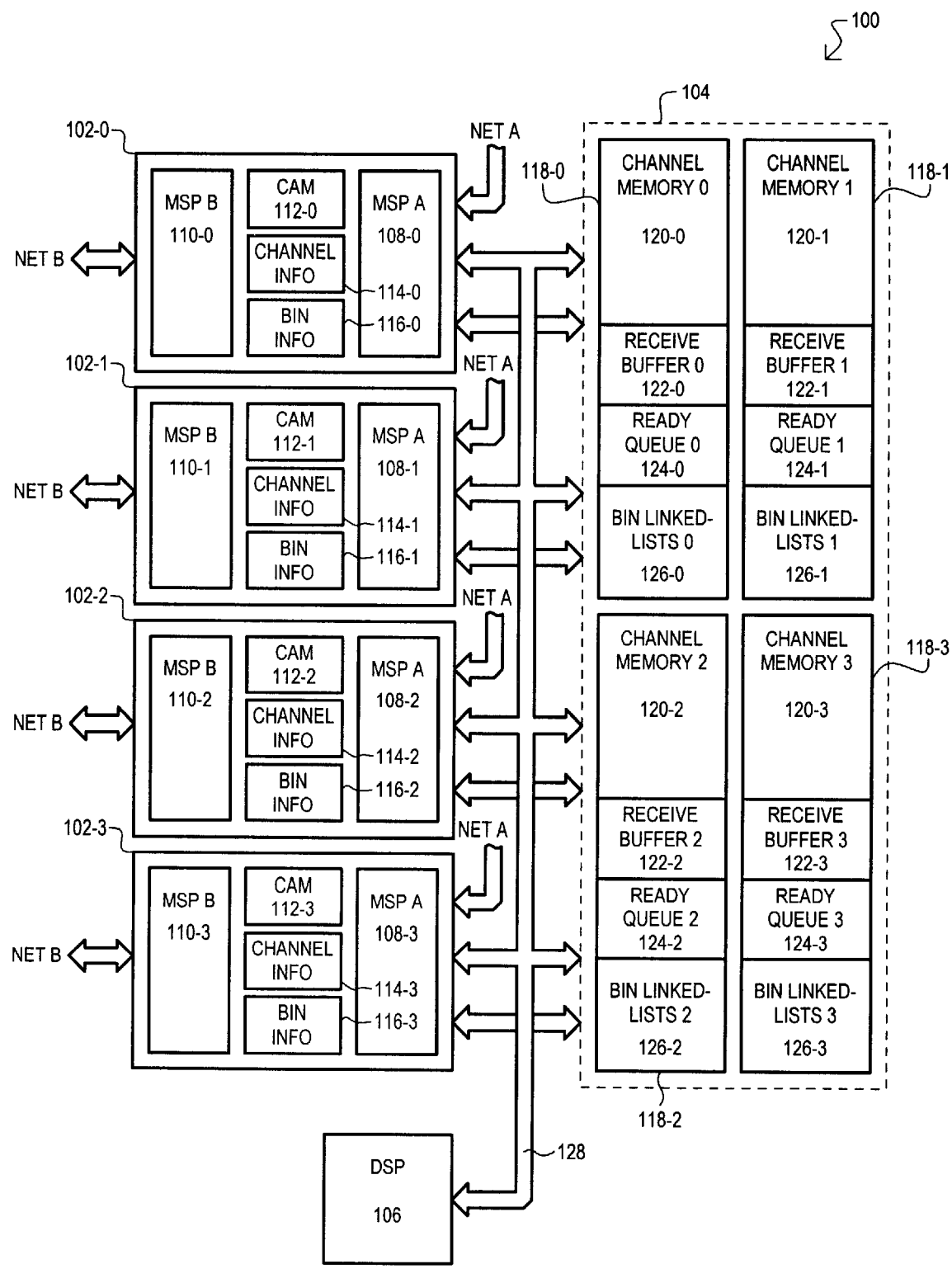
FIG. 1 is a block diagram of a first embodiment

Referring now to FIG. 1, a first embodiment is set forth in a block diagram and designated by the general reference character 100. The first embodiment 100 can include a system that can receives voice data by way of a first network structure (shown as NET A) and transmit data on a different network structure (shown as NET B). As just one example, a first network structure (NET A) can include a "T3" or "T1" trunk line that carries voice data in a time division multiplexed (TDM) format. The second network structure (NET B), as just one example, can include an IEEE 802.3 compliant network. Of course, these particular network structures should not be construed as limiting the present invention thereto.

Voice data can conceptualized as being voice data "samples." That is, voice data can be voice data taken over a certain amount of time. Of course, such a voice data sample can have a variety of formats. It may be encoded, compressed, or otherwise manipulated in some fashion. Voice data may be categorized as belonging to particular channels. A channel may represent, for example, a particular voice data source. Therefore, the disclosed embodiments can receive voice data from various channels, store them, and then transmit multiple voice channel data in a single packet according to predetermined criteria. One such criterion can be a common destination for the voice channel data.

Referring back to FIG. 1, the particular system 100 illustrated is shown to include a number of processor subsystems 102-0 to 102-3, a memory subsystem 104, and a signal processor 106.

Generally, the system 100 can receive voice data by way of network NET A, and store the voice data in the memory subsystem 104. The voice channel data can be processed by signal processor 106 and then received by a receiving processor subsystem (102-0 to 102-3). The receiving processor subsystem (102-0 to 102-3) can write the voice data into the memory subsystem 104 in a particular format (i.e., a receiving processor subsystem can "build" a voice channel in a memory subsystem 104). The receiving processor subsystem (102-0 to 102-3) can write identifying information for the voice channel to a memory subsystem 104 location associated with a transmitting processor subsystem (102-0 to 102-3). It is noted that the transmitting processor subsystem (102-0 to 102-3) can be the same as, or different than, the receiving processor subsystem (102-0 to 102-3).

The transmitting processor subsystem (102-0 to 102-3) can continue to accumulate information on voice channels that it will transmit. According to criteria established to meet a particular latency value and/or quality of service (QoS), the transmitting processor subsystem (102-0 to 102-3) can transmit the voice data associated with its voice data information.

In the particular arrangement of FIG. 1, the processor subsystems (102-0 to 102-3) are shown to include a first network processor (MSP A) (108-0 to 108-3), a second network processor (MSP B) (110-0 to 110-3), a content addressable memory (CAM) (112-0 to 112-3), channel information storage unit (114-0 to 114-3), and a bin information storage unit (116-0 to 116-3).

The MSP A and MSP B processors (108-0 to 108-3 and 110-0 to 110-3) can access the memory subsystem 104, and manipulate the data stored within according to predetermined instructions and information stored within their associated channel information storage units (114-0 to 114-3) and bin information storage units (116-0 to 116-3). In one particular arrangement, the MSP A and MSP B processors (108-0 to 108-3 and 110-0 to 110-3) can accumulate voice channel information and transmit such information in a multiplexed packet form with a predetermined latency and/ or QoS.

The CAMs (112-0 to 112-3) can store indexing information to identify particular voice data according to packet identifying information. In particular, a CAM may receive packet information for voice packet data received on network NET B. The indexing information can be used to generate addresses for locations in the memory subsystem 104, where the voice channel data can be stored. More particularly, the CAMs (112-0 to 112-3) can store indexes for voice data received in a multiplexed voice data packet format.

Channel information storage units (114-0 to 114-3) can store information for the various voice channels processed by its processor subsystem (102-0 to 102-3). As just a few examples, stored channel information can include voice channel size and maximum latency value for a given voice channel. Channel information can also be utilized to provide QoS for voice channels. Channel information can include priority value for a given channel. Higher priority voice channels can be binned in higher priority bins.

Bin information storage units (116-0 to 116-3) can store various bin criteria used by a processor subsystems (102-0 to 102-3) to determine when accumulated voice data will be transmitted (i.e., a bin will be "dumped"). As just a few examples, bin information can include a maximum transmitted packet size, a current bin size (the amount of voice channel data accumulated for a bin), a maximum allowable bin size, the amount room in a bin, a current timer count for a bin (the amount of time before the bin will be transmitted), a maximum timer count for a bin (the maximum amount of time that may pass before a bin will be transmitted), a current number of voice channels for a bin, and a maximum number of voice channels for a bin.

As in the case of the channel information, bin information can also be provided that is utilized to provide QoS options for bins. That is, particular bins can be assigned or created having different QoS capabilities. Such information can include a bin priority value (a higher bin priority can correspond to a higher QoS for the voice channels in the bin), an average channel size (an average size of voice channels for the bin), base max latency value (an assumed maximum latency value for the bin for a given QoS), a base max bin size value (an assumed maximum size value for the bin to provide a given QoS), maximum latency increase and decrease rates (rates at which to decrease/increase a maximum latency value in response to network bandwidth), maximum bin size increase and decrease rates (rates at which to decrease/increase a maximum bin size in response to network bandwidth).

Various other channel specific and/or bin specific information can be stored in the channel information storage units (114-0 to 114-3) and/or bin information storage units (116-0 to 116-3).

The memory subsystem 104 can include a number of memory sections 118-0 to 118-3. Memory sections 118-0 to 118-3 can be conceptualized as corresponding to processor subsystems 102-0 to 102-3, respectively. Each memory section (118-0 to 118-3) can be logically divided in various portions, including a channel memory (120-0 to 120-3), a receive buffer (122-0 to 122-3), a ready queue (124-0 to 124-3), and group of bin-linked lists (126-0 to 126-3).

An alternate embodiment may include "static" bins that transmit their contents after a predetermined interval of time. Such an embodiment may not include a ready queue (such as 124-0 and 124-3).

While the various memory sections (118-0 to 118-3) and their corresponding portions could be formed in physically separate memory devices, in the preferred embodiment, the memory subsystem 104 can include a contiguous static random access memory (SRAM) array. Further, the SRAM array can be embedded into a larger integrated circuit device. Such an SRAM array can be expandable as well, by incorporating additional, physically separate SRAM devices. An embedded SRAM array can provide rapid access to data for the various processor subsystems (102-0 to 102-3).

The channel memories (120-0 to 120-3) can store received voice channel data for a particular receiving network processor. As just one example, channel memories 120-0 to 120-3 can store voice channel data that is received by MSP A processors 108-0 to 108-3, respectively. The voice channel data stored by the channel memories (120-0 to 120-3) do not necessarily include only voice data. As just one example, voice channel data can be stored in a packet template form, so that it may be read directly as a part of a transmitted packet. Accordingly, channel memories (120-0 to 120-3) can include header information (such as a multiplexer header) in addition to voice channel data.

The receive buffers (122-0 to 122-3) can function as an immediate buffer for voice data received for a particular receiving network processor. As just one example, voice data processed by signal processor 106 can be stored in the receive buffers (122-0 to 122-3). The corresponding processor can then transfer buffered voice data within the receive buffers (122-0 to 122-3) to its corresponding channel memory (120-0 to 120-3).

The ready queues (124-0 to 124-3) can store voice channel information for a particular transmitting processor. The voice channel information can be provided by a receiving processor once the entire voice channel has been stored. The transmitting processor and receiving processor do not necessarily have to belong to the same processor subsystem. In one particular embodiment, voice channel information can be read by a transmitting processor (i.e., "popped") from its ready queue. The transmitting processor can utilize the voice channel information in a binning algorithm to determine how the voice channel will be binned.

As noted above, other embodiments may not include ready queues (124-0 to 124-3). Such an embodiment will be discussed in conjunction with the description of the bin linked-lists that follows.

The bin linked-lists (126-0 to 126-3) are linked-lists that can be formed to enable the transfer of channel information from a channel memory (120-0 to 120-3). A bin linked-list (126-0 to 126-3) may have a variety of forms as but two examples, a bin linked-list (120-0 to 120-3) may have a more "static" form. In a static form, a bin-linked list may be formed at the time a call is "setup" or "torn down." That is, a bin-linked list may be formed when a connection for a particular voice traffic flow is established or disconnected. A more static bin-linked list may be a list that accesses predetermined locations within a channel memory (120-0 to 120-3). Because a linked-list is not formed "on the fly" in such an embodiment, such an embodiment may not include a ready queue (124-0 to 124-3).

Figure 2:
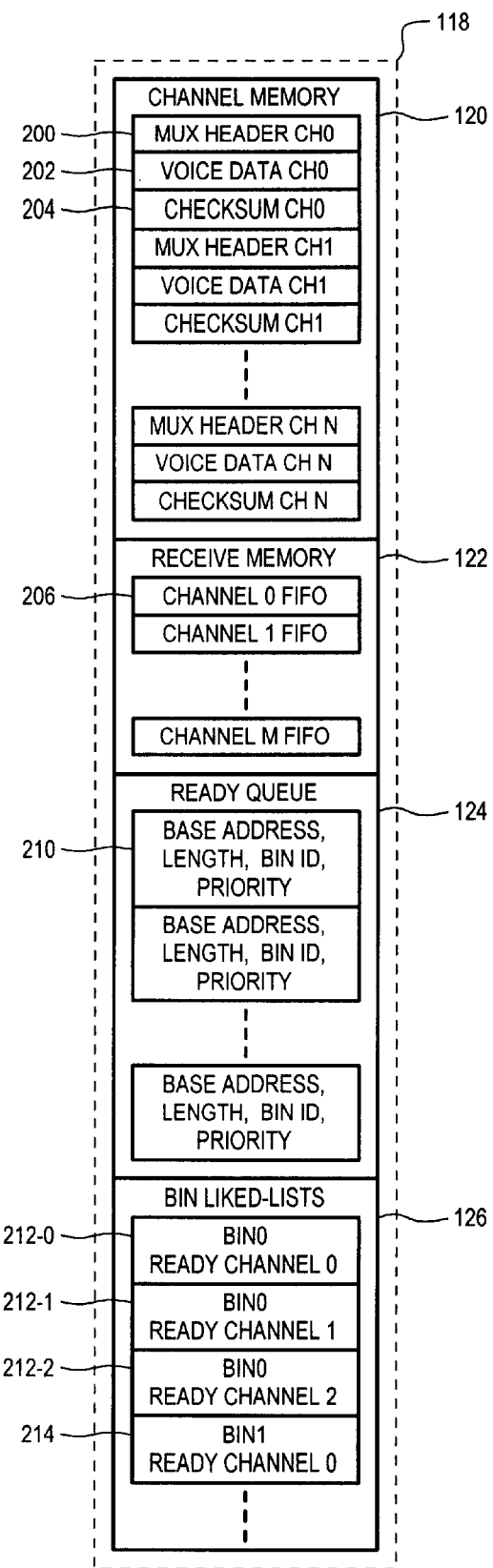
FIG. 2 is a block diagram of a memory section that may be used in the first embodiment.

Another embodiment may form bin linked-lists from channel information in a ready queue (124-0 to 124-3). Such an embodiment may be considered as having "dynamic" linked-lists. A transmitting processor can take voice channel information popped from a ready queue (124-0 to 124-3) and append it to a linked-list according to a binning algorithm. The linked-list can also be used to transmit a multiplexed packet according to the binning algorithm. Referring now to FIG. 2, one example of a memory section, such as those shown as 118-0 to 118-3 in FIG. 1, is set forth in a block diagram. The memory section is shown as 118 and includes a channel memory 120, a receive buffer 122, a ready queue 124, and bin linked-lists 126.

In the particular arrangement of FIG. 2, the channel memory 120 is shown to store voice channel data in a particular format conducive to multiplexed packet transmission. For each stored voice channel, there is a multiplexer header (one of which is shown as 200), a voice data payload 202, and a checksum value 204 for the binary information of the voice channel. It is understood that while particular voice channels can be stored at predetermined locations in the channel memory 120, the voice channels can be individually transmitted by different transmitting processors according to the corresponding linked-list of a bin.

The receive buffer 122 can buffer voice channel data for a given receiving processor. In the particular arrangement of FIG. 2, the receive buffer can function as a circular first-in-first-out (FIFO) memory. As just one example, a signal processor (such as 106 in FIG. 1) can receive time division multiplexed (TDM) voice data. The received data can be placed according to its particular time slot on a receive bus 128. Particular time slots can be written into a channel FIFOs, one of which is shown as item 206, and thereby accumulate voice channel data. As noted above, such buffered voice channel data can be processed by a receiving processor, and then written into the channel memory 118 (in a multiplexed packet format, in the case of FIG. 2).

In an embodiment having "dynamic" linked-lists, the ready queue 124 can store information for out-going voice channel data for a transmitting processor. In the particular approach illustrated by FIG. 2, voice channel information can include the base address of the voice channel data (which can indicate a location within a channel memory 118), a length value (which can indicate the length of the voice channel data), a bin identification value (which can indicate a particular bin that the voice channel is to be placed in), and a priority value (which can indicate a particular QoS value for the voice channel). One voice channel information entry is shown in FIG. 2 as item 210.

Bin-linked lists 126 can link together voice channel data in a transmitting operation when a bin is dumped. In particular, in a "static" arrangement, voice channel can be transmitted according to a bin linked-list at regular intervals. In a "dynamic" arrangement, as voice channel information in the ready queue 124 is "popped," the information is appended to the linked-list of its particular bin. According to a binning algorithm and/or QoS algorithm run by a transmitting processor, voice channels will be transmitted according to a linked-list. In FIG. 2, one bin is shown to include the information for three voice channels (212-0 to 212-2) linked together to form a bin, shown as BIN0. The beginning of a second linked-list for a bin BIN1 is shown as 214.

Having described the general constituents and a memory arrangement for a first embodiment 100, the general operation of the first embodiment will now be described. In the general description, one particular flow of voice data will be described. Voice channels will be described as being received in TDM form on network structure NET A. Voice channel will then be transmitted in multiplexed format on network structure NET B. In general, as voice data it is received it is "scattered" to particular locations within the memory subsystem 104. When the voice channel is to be transmitted within a predetermined latency, it is "gathered" and transmitted in multiplexed voice channel packets.

TDM voice data is received on NET A. One of the receiving processors (MSP A 108-0 to 108-3) can receive voice data according to a particular TDM timeslot. This voice data can be passed on to the signal processor 106. The signal processor 106 can assign the voice channel data to an outgoing timeslot. Voice channel on a particular out-going timeslot is written into a receive buffer (122-0 to 122-3) associated with a particular receiving processor (MSP A 108-0 to 108-3). The receiving processor (MSP A 108-0 to 108-3) can create a multiplexed header in a channel memory (120-0 to 120-3), and then write voice channel data from its receive buffer (122-0 to 122-3) to the location in its channel memory (120-0 to 120-3), along with a checksum value. In this way, received voice data can be conceptualized as being "scattered" within memory subsystem 104 as it is received.

In a "static" linked-list arrangement, a bin-linked list may already be present that can provide access to a sequence of channel memory (120-0 to 120-3) locations. In a "dynamic" linked-list arrangement, according to the destination of the voice channel data, receiving processors (110-0 to 110-3) can write information for a voice channel to the ready queue (120-0 to 120-3) of a transmitting processor (110-0 to 110-3). The transmitting processor (110-0 to 110-3) can pop the voice channel information as it is received, and build a linked-list for a particular bin according to a binning algorithm (and/or a QoS algorithm). The binning algorithm can also monitor the size and/or latency of the bin formed by the linked-list, and transmit the voice channels to meet predetermined latency and/or other criteria.

In this way, received voice channels can be conceptualized as being "gathered" for common transmission by a preset bin linked-list (in a "static" arrangement), or according to a binning algorithm (in a "dynamic" arrangement).

When a multiplexed voice channel packet is to be transmitted, a memory controller can processes a linked-list associated with the bin, and thereby provide contiguous transfer of memory. This is in contrast to a typical memory access which will read from a particular addresses one at a time. A system can include a direct memory access (DMA) controller that has access to network structure, and transport the entire multiplexed voice channel packet onto the network structure.

It is understood that while the gathering of multiple voice channels into a multiplexed packet has been described above, simplex voice channel packets can also be processed. In such a case, when the voice channel information is popped, the information can be used to immediately transmit the simplex voice channel.

It is also understood that while the system of FIG. 1 has been described with reference to a process that accumulates voice channel data from a network structure NET A and transmits it in multiplexed format on network structure NET B, voice channel data may flow the other direction as well. As just one example, voice channel data can be received in packet form from network structure NET A, and then transmitted in TDM format (assigned a particular timeslot) on network structure NET B.

While the described system may be utilized with a number of various protocols, the system of FIG. 1 may be advantageously utilized with "real time" protocols, such as the real time transport protocol (RTP) and/or real time transport control protocol (RTCP). In such an application, simplex voice data can be identified by IP Source Address and UDP Destination Port Address. Multiplexed Voice data can be identified by UDP Destination Port. An IP Source Address can include channel identifier can be used to delineate individual channels within a RTP multiplexed packet. Such a delineation may advantageously be performed with a CAM (112-0 to 112-3) of the various processor subsystems (102-0 to 102-3).

Binning Method

"Binning" of voice channel data may be established when a call is setup (for "static" bins), or as voice channels arrive (for "dynamic" bins). A transmitting processor can "bin" the voice channels according to a "binning" method. According to one embodiment, a binning method can add an incoming voice channel to a bin in a way that maximizes bin performance for all bins. Initially all bins are examined to determine which bins can receive a new voice channel (i.e., have enough room for the received voice data). Those bins that can accept the new voice channel can be considered bin "candidates." A bin performance for the bin candidates prior to the addition of the voice channel can be calculated ("current bin performances" can be calculated). In addition, a bin performance for the bin candidates can be calculated that represents how a bin would perform if the voice channel was added to it ("projected bin performances" can be calculated). The current bin performances and projected bin performances can be used to determine which particular bin should receive the voice channel in order to maximize the performance of all bins.

Referring now to FIG. 3, a flow diagram is set forth illustrating a detailed example of a binning method according to one embodiment. In the arrangement of FIG. 3, various bins have corresponding timers that can begin to count when created and/or a voice channel is received for the bin. Each bin can have a corresponding maximum size (Smax) and maximum latency (Tmax). Once its maximum count value reaches a maximum latency, a bin can be transmitted.

The binning method of FIG. 3 is designated by the general reference character 300, and can begin with a step that determines which bins have enough available room to receive a newly arrived voice channel. In step 302, for each of "k" bins, a projected bin value (new$\Delta$Sk) can be calculated. The new$\Delta$Sk value is generated by determining the lesser of a maximum bin size (Smaxk) or a maximum packet size (Smaxp). The current size of the bin Sk and the size of the voice channel S are subtracted from this value. If this value is less than or equal to zero, there is no room in the bin and the next bin can be examined. If there is room in the bin, the bin can be considered a bin candidate. If no bins have enough room for the arriving voice channel (of size S), a new bin is created (step 304).

Once one or more bin candidates are identified, a performance value is calculated for each bin. In step 306, for each of the "j" bins, a performance value is calculated with the equation $$fj = \left| \frac{\Delta Tj}{\alpha} - \Delta Sj \right|$$

where $\Delta Tj$ represents how much time remains before the counter reaches a maximum value (remaining count) and $\Delta Sj$ represents how much additional voice channel data the bin can receive. The value $\alpha$ represents the relation between the maximum timer value Tmaxj and maximum size value Smaxj as set forth below $$Smaxj = \frac{Tmaxj}{\alpha}.$$

Projected bin sizes can then be determined. Projected bin sizes can represent the size of a bin in the event the voice channel is added to the bin. Step 308 illustrates one way of calculating projected bin sizes ($\Delta Sj$), and includes determining the lesser of a maximum bin size (Smaxk) or a maximum packet size (Smaxp) is determined. The $\Delta Sj$ value can be calculated in the same general fashion as the $\Delta Sk$ values of step 302.

Once projected bin sizes (new$\Delta Sj$) are calculated, new count values for the "k" bin candidates can be determined. In the arrangement of FIG. 3, new count values are determined by step 310 which takes the lesser of the remaining count $\Delta Tj$ and a maximum bin count value Tmax.

Once projected bin sizes (new$\Delta Sj$) and new count values (new$\Delta Tj$) are determined, projected performance values for the bin candidates can be calculated (step 312). The projected performance values indicate how the addition the new voice channel data will affect the transmission of data from a bin. Projected performance values "new fj" are calculated in the same general fashion as the performance values of step 306, but utilize the new$\Delta Tj$ and new$\Delta Sj$ values.

Projected performance values (new fj) of bin candidates can be compared with their corresponding previously calculated performance values (fj). From the comparison, the voice channel can be added to a bin to maximize the performance over all bins. In FIG. 3, step 314 compares performance values with the equation $$Cj = \frac{fj\text{-new } fj}{fj}.$$

The voice channel is placed in a bin so as to maximize the value Cj for all bins.

Figure 3A:
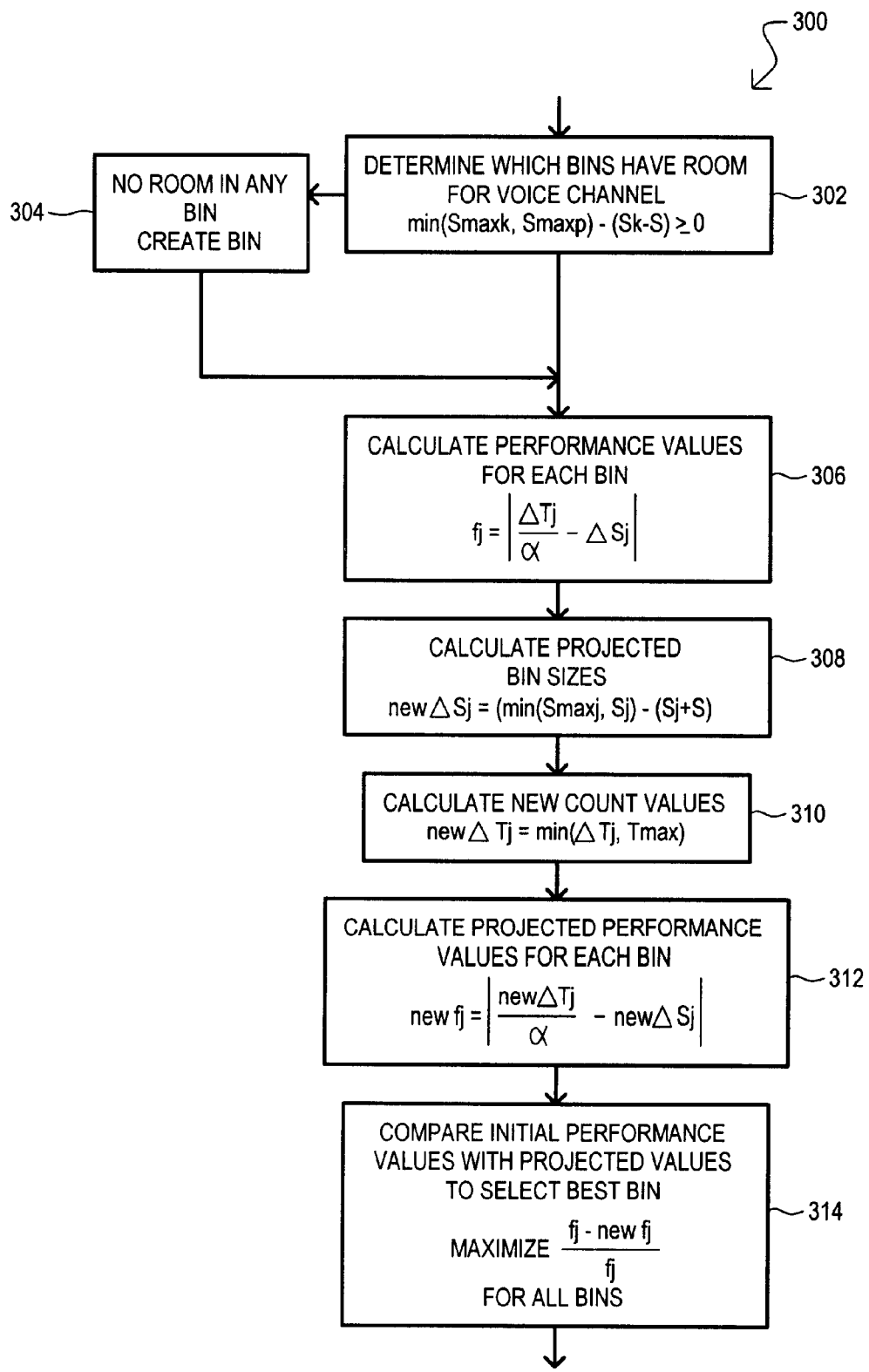
FIG. 3A is a flow chart illustrating a binning method according to an embodiment.
Figure 3B:
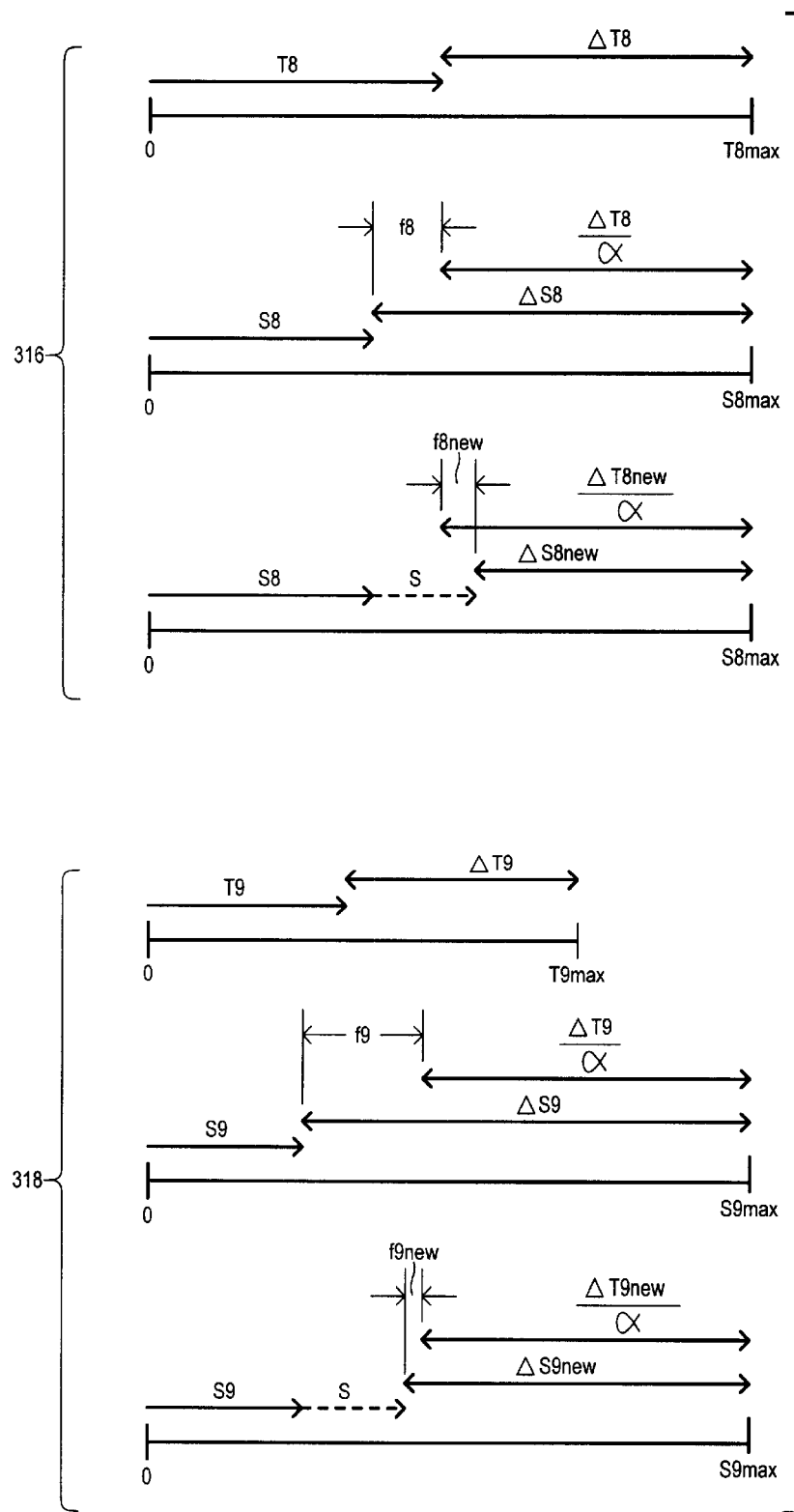
FIG. 3B is a diagram illustrating the method of FIG. 3A.

FIG. 3B includes a number of diagrams provided to illustrate the method of FIG. 3A. FIG. 3B illustrates performance values and projected performance values for a bin #8 (shown as 316) and a bin #9 (shown as 318). The top graph of each bin diagram (316 and 318) shows the current bin count (T8 and T9) and remaining bin count ($\Delta T8$ and $\Delta T9$) in relation to maximum count values (Tmax8 and Tmax9).

The middle graph of each bin diagram (316 and 318) illustrates a representation of a current performance value (f8 and f9) for each bin.

The lower graph of each diagram (316 and 318) illustrates a representation of a projected performance value (f8new and f9new) that will result from the addition of a newly arrived voice channel of size "S."

If bins #8 and #9 were the only bins of the system, the newly arrived voice channel would be added bin #9, as doing so maximizes bin efficiency for both bins.

In this way, bin performance can be monitored, projected bin performance values calculated, and a new voice channel binned according to projected bin performance values.

The approach of FIG. 3 illustrates a method that can be used with bins that continually count at a particular rate as voice channel data is added.

While present invention is not necessarily limited to such a particular approach, the binning method illustrated by FIG. 3 can be implemented as a series of instructions executed by a transmitting processor in a system such as that set forth in FIG. 1.

Dynamic Bin Transmit Method

An alternate approach to transmitting multiple voice channel data from a bin can include a "dynamic count" approach. Unlike the approach of FIG. 3, that may utilize bins with "static" counts, a dynamic approach can adjust count values according to the size of received voice channel data. As one general example, if the amount of voice channel data remains the same, the count value for the bin will approach a maximum count limit incrementally. However, as new voice channel data is accumulated, the count value will more rapidly approach the count limit. When the count limit is reached or exceeded, the bin can transmit its data.

Figure 4:
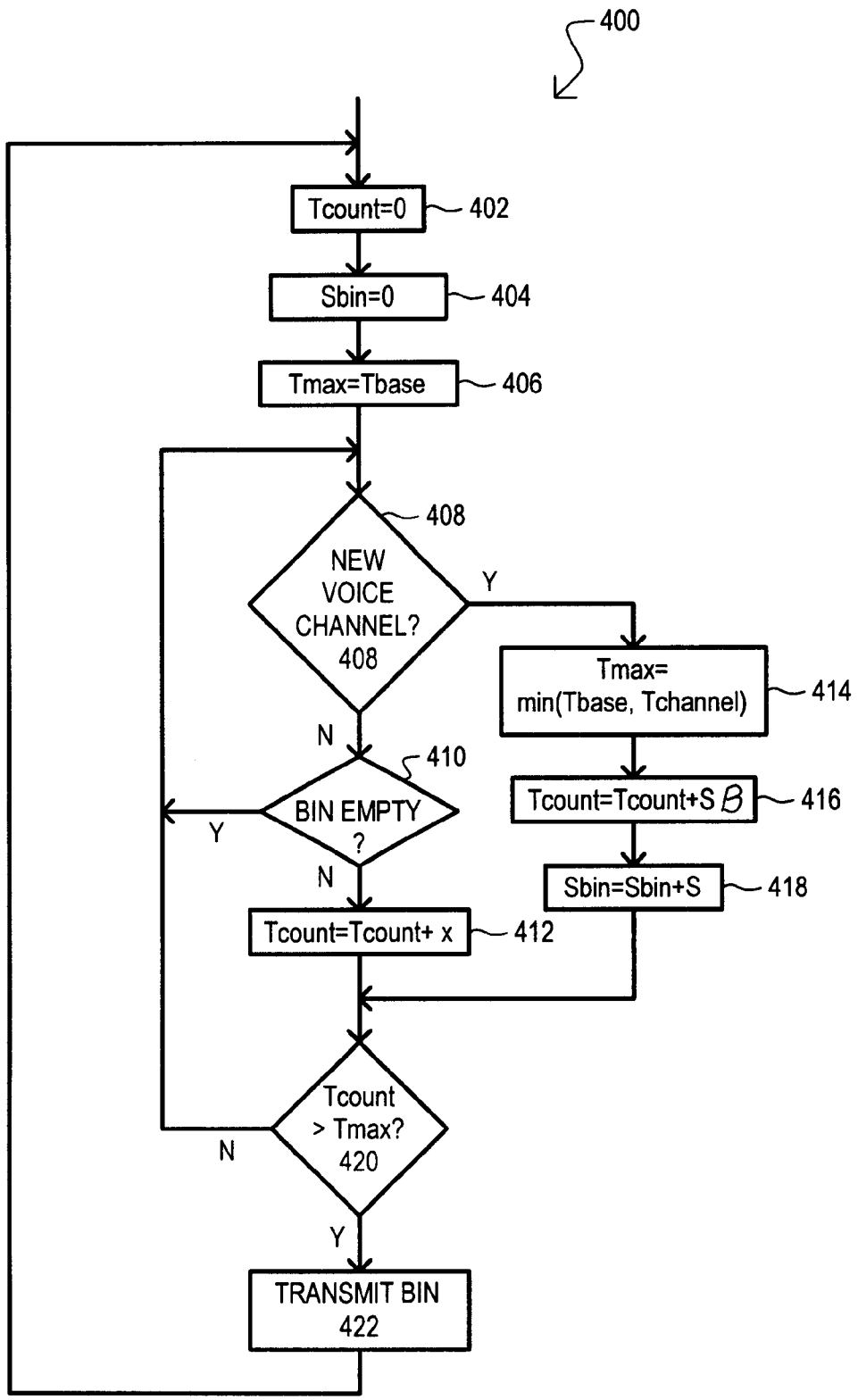
FIG. 4 is a flowchart illustrating a dynamic bin transmit method according to an embodiment.

Referring now to FIG. 4, a general flow chart is set forth illustrating a method for determining when to transmit the accumulated voice channel data for a bin. The flow chart is referred to by the general reference character 400, and can begin by initializing some values for the bin. A bin count value Tcount and a current bin size Sbin can be set to zero (steps 402 and 404). In addition, a count limit Tmax can be set to an initial base limit Tbase (step 406). The base limit can be determined according to a QoS method that will be described in more detail below.

The count value Tcount will be adjusted according to whether new voice channel data is received. In the particular example of FIG. 4, as shown by step 408, if new voice channel data is not received, and the bin is empty, the bin values remain at its previously set values (step 410). If a new voice channel data is not received, but the bin is not empty, the count value Tcount is incremented by a value "x" (step 412). The value x can correspond to the rate at which data can be transmitted.

If a new voice channel has been received, the count value can be adjusted to reflect the additional time that will be required to transmit the (now) larger size bin. In the arrangement of FIG. 4, a count limit Tmax is adjusted in the event the latency requirement for the newly arrived voice channel (Tchannel) is less than the current count limit (step 314). The current count value Tcount is also increased according to the size of the new voice channel S (which can include associated header information) and a transmitting factor given as β, where represents the rate at which voice data can be transmitted. As shown in FIG. 4, the count adjustment is given by the equation $$T\text{count}=T\text{count}+S*\beta(\text{step }416),$$

where S is the size of the newly arrived voice channel.

The arrival of a new voice channel can also result in an adjustment to a bin size value Sbin. This value may be used by other algorithm described later. In the arrangement of FIG. 4, a bin size value Sbin can be increased according to the following equation $$S\text{bin}=S\text{bin}+S(\text{step }418).$$

Once a count value has been adjusted incrementally (such as step 412), or in response to the addition of another voice channel to the bin (such as step 416), the new count value Tcount is compared to the current count limit (step 420). If the count limit is exceeded, the bin can be transmitted (step 422). Otherwise, the bin can await the arrival of a new voice channel value and/or continue and incremental change.

While present invention is not necessarily limited to such a particular approach, the dynamic bin transmitting method illustrated by FIG. 4 can be implemented as a series of instructions executed by a transmitting processor in a system such as that set forth in FIG. 1.

QoS Method

A QoS method according to one embodiment can create bins according quality of service (QoS) requirements. One way in which QoS for a bin can be established is by assigning a particular size limit (Smax) and a latency limit (Tmax) to the bin. These values, and if desired, additional values, can be used to given a bin a particular priority value. Incoming voice channels can be placed in those bins having a matching priority. The voice channel can then be joined with other voice channels (time permitting), and transmitted as multiplexed voice channel packet.

Figure 5A:
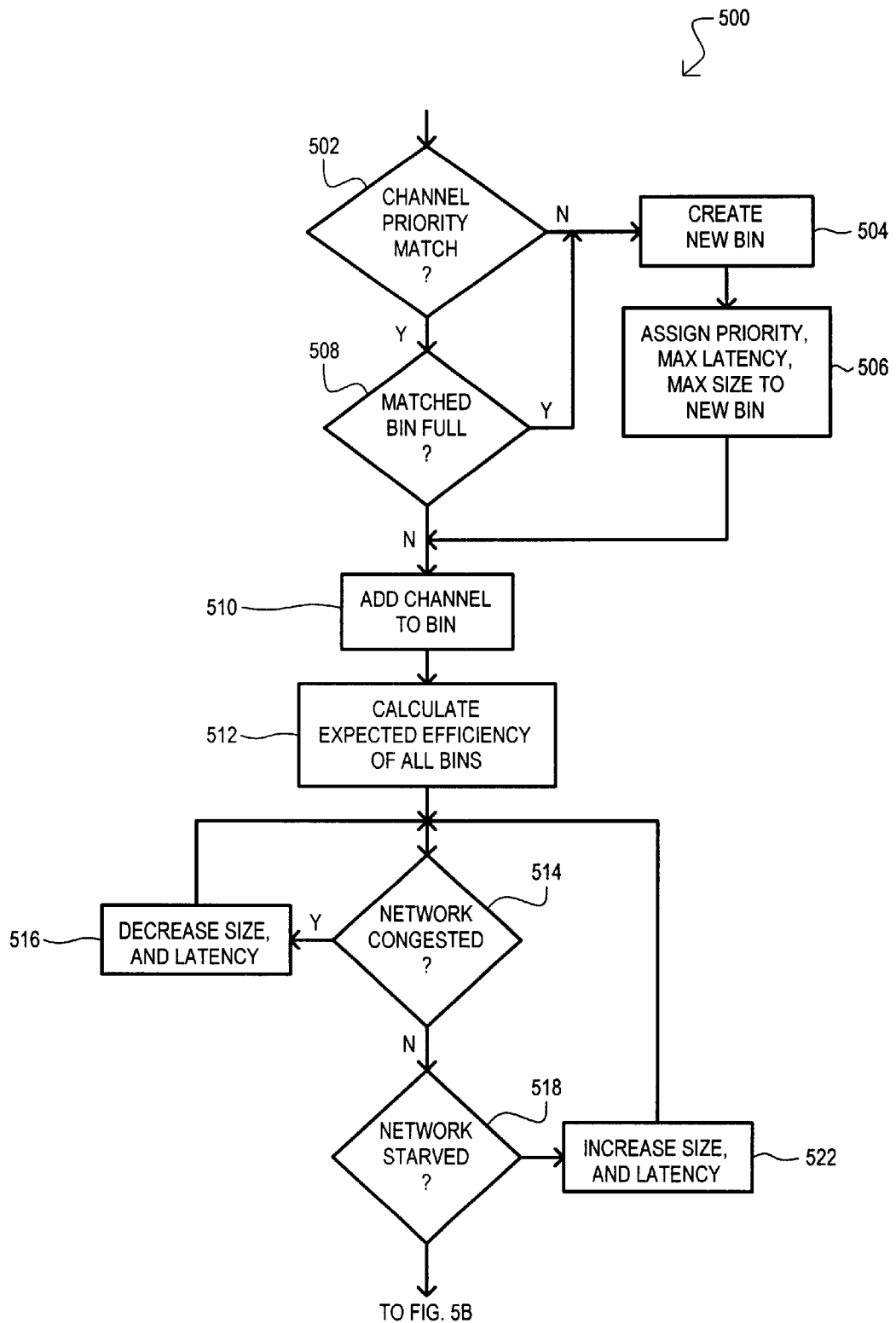
FIGS. 5A and 5B are flow diagrams illustrating a quality of service (QoS) method according to an embodiment.
Figure 5B:
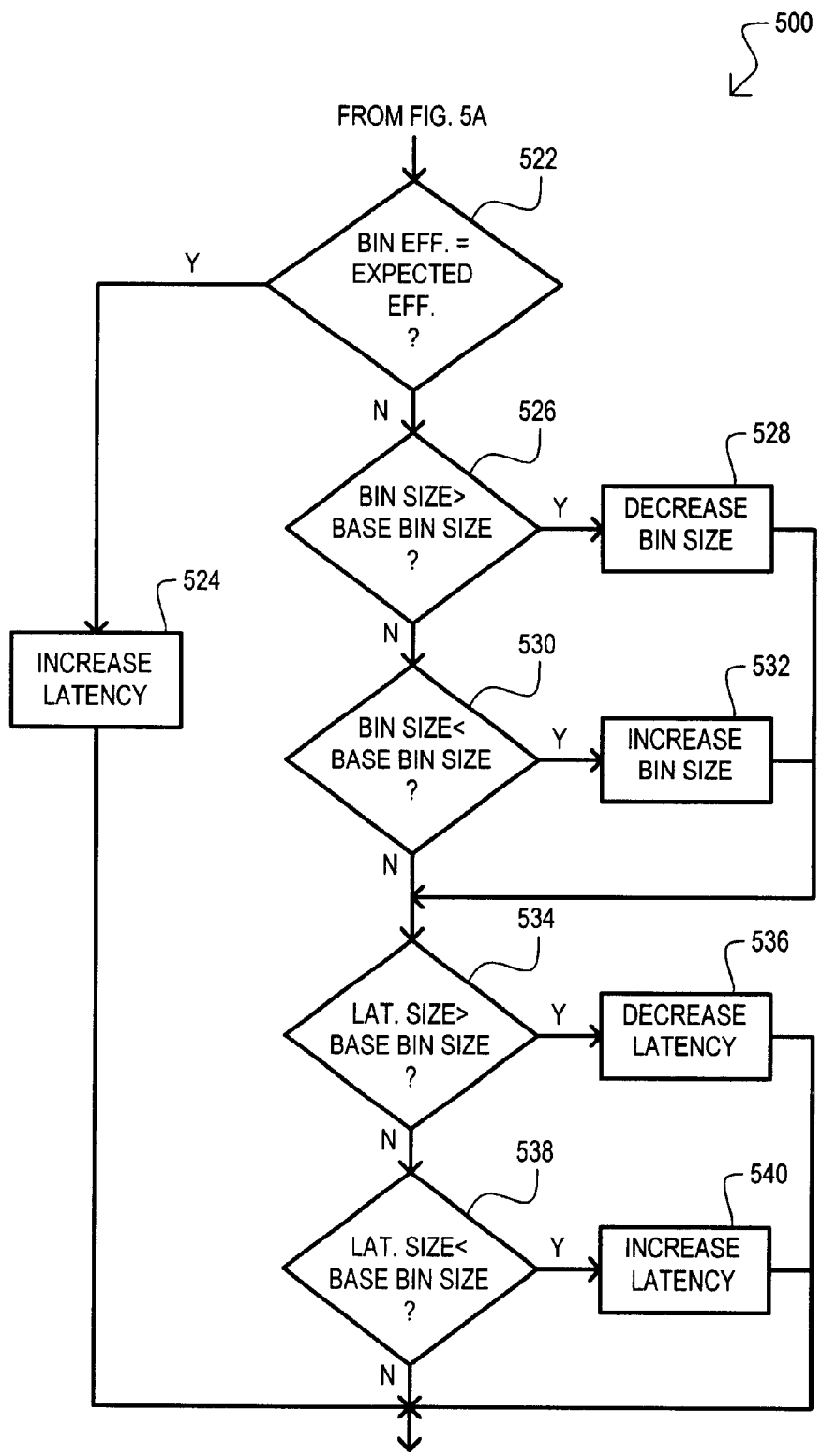

A QoS method is set forth in FIGS. 5A and 5B. Referring now to FIG. 5A, a QoS method can include determining the priority of an arriving voice channel. The voice channel priority can be compared with the priority of existing bins (step 502). In the event a bin does not currently exist that includes matching priority criteria, a new bin is created 504. As just one example, such a step can include beginning a newly linked-list for a bin.

If new bin is formed, particular information for the bin can be assigned. In the particular case of FIG. 5A, priority, maximum latency, and maximum size values can be assigned (step 506).

If one or more bins exist that have a matching priority of a new arrived voice channel, the bin is examined to ensure that the newly arrived voice channel will fit within the bin (i.e., addition of the new voice channel does not exceed a maximum bin size value) (step 508). If the voice channel will not fit, a new bin can be created according to steps 504 and 506.

If a new bin has been created or a bin has enough room to receive a newly arrived voice channel, the voice channel is added to the bin (step 510). As just one example, such a step can include appending a linked-list with the information related to the voice channel. It is noted that the voice channel can be added to a particular bin according to a binning algorithm, such as that described above.

A QoS method can continue with a step that determines the expected efficiency of the bins (step 512). The expected efficiency can be determined from a maximum bin size value, maximum bin latency value, an average voice channel size, and a voice channel number value. As just one example, an ideally efficient bin will "time-out" (reach a maximum latency value) at the same time it is full (reaches a maximum bin size).

With expected efficiency values established for the various bins, a QoS method can proceed by adapting to feedback from network conditions. Such an adaptation can include determining if a network (on which the multiplexed packet will be transmitted) is congested (step 514). As just one example, a network protocol, such as various "real-time" transport protocols, can give an indication of network congestion. If the network is congested, the bin size and latency values can be decreased (step 516). A decrease in bin size can help ensure the probability that the entire multiplexed voice packet will reach its destination. Further, decreases in size and latency can increase the rate at which multiplexed voice channel will be transmitted. Increases in transmit rate can help to ensure a maximum latency value for the various voice channels of the packet.

A QoS feedback adaptation can also include determining if a network is "starved" (i.e., the bandwidth is underutilized) (step 518). If the network is starved, the bin size and latency values can be increased (step 520). An increase in size and latency can allow larger packet sizes to be transmitted. Quality of service may still be achieved as transit time in a starved network may be shorter.

In addition to adaptations responsive to network conditions, a QoS approach can include an adaptive response to bin efficiency. Referring now to FIG. 5B, a QoS method can continue by comparing the actual efficiency of each bin with its corresponding expected efficiency (step 522). If the actual efficiency of a bin is less than its expected efficiency, the bin can be conceptualized as "timing out" (transmitting its accumulated voice channel data) before it is full. Thus, according to the disclosed embodiment, if a bin's efficiency is less than its expected efficiency, the bin can "adapt" to increase its efficiency. In the particular, in FIG. 5B an inefficient bin can incrementally increase its latency (step 524), thereby allowing more voice channel to accumulate before the bin is transmitted.

If a bin is operating at a desired efficiency (or within a desired efficiency range), the current bin size can be compared with a base bin size (step 526). If the current bin size is greater than the base bin size, the bin size can be incrementally decreased (step 528). This general approach can be repeated to decrease bin and/or latency size to the base values (steps 530 to 540). Such changes may preferably take place at the time a call is setup, or in addition or alternatively, periodically while the system is in operation.

In this way, bin values can be assigned base values to provide a general QoS level. As network traffic increases or decreases, bin values can adapt for more efficient operation. Further, if bins are not efficient, their performance can be adjusted to increase efficiency. In addition, if bin efficiency is considered sufficient, bin performance can be gradually adjusted back to base performance values.

A QoS method is also disclosed in FIGS. 6A and 6B. The method is described in "pseudocode" in FIG. 6A, which can be a broad way of expressing a process. The pseudocode process can be implemented into particular computer language code versions for use in a system employing a general processor. In addition, the described algorithm can be implemented in a higher level hardware designing language, to enable the preferred embodiment to be realized as an application specific integrated circuit (ASIC) or a portion of an ASIC. Pseudocode is widely used in industry and textbooks to express processes, and would be understood by one skilled in the arts of computer systems and/or hardware designing arts.

In the particular approach of FIG. 6A a number of variables are utilized. These variables are described in a table in FIG. 6B. As just one possible embodiment, the method of FIG. 6A can be executed by a processor such as processors 108-0 to 108-3, to create bins according to QoS, and to dynamically adjust the operation of such bins according to network conditions.

Second Embodiment

Figure 7:
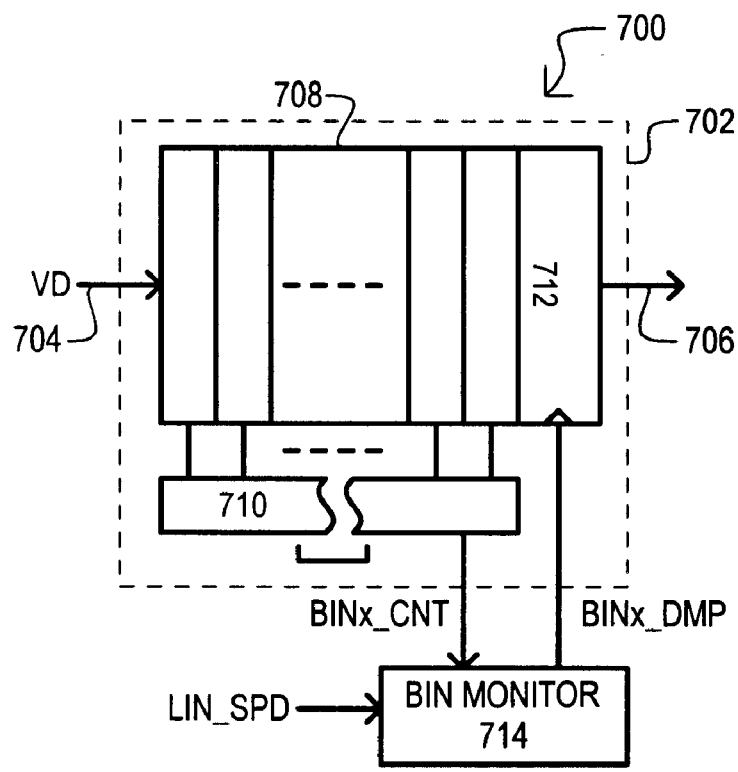
FIG. 7 is a block diagram of second embodiment.

While FIG. 1 sets forth a particular memory structure and associated processors, other structures may be employed to accumulate voice data from different channels and transmit the voice channel data in a multiplexed packet. One such alternate embodiment is set forth in FIG. 7. FIG. 7 illustrates an apparatus that may be used in a dynamic bin transmit approach, such as that set forth in FIG. 4.

Referring now to FIG. 7, a second embodiment is set forth in a block diagram. The second embodiment is designated by the general reference character 700, and is shown to include a bin system 702. The bin system 702 receives voice data (VD) from multiple sources (channels) at a voice data input 704, and at a predetermined time, outputs (dumps) the voice data on a voice data output 706 in a single transmission operation.

The bin system 702 of FIG. 7 is shown to include a storage portion 708, a count recorder 710, and an output control portion 712. The storage portion 708 includes a number of storage locations for storing accumulated voice data. It is understood that the storage portion 708 can take a variety of forms. As just a few examples, the storage portion 708 can store voice data in parallel or serial form, and the voice data can be encoded, for security reasons or in order to compress the data. Further, among the many possible arrangements for the storage portion 708 are a first-in-first-out (FIFO) configuration or a random access memory (RAM) configuration, to name just two possible examples. Of course, custom memory designs can also be employed. Due to the possible configurations, it is also noted that while the voice data input 704 and voice data output 706 are shown separately in FIG. 7, the voice data input 704 and voice data output 706 can be commonly coupled to a single input/output (I/O) bus (not shown).

The count recorder 710 provides an on-going value that indicates how much data has is currently accumulated within the storage portion 708. This bin count value is shown as BINx_CNT in FIG. 7, where the variable "x" can indicate one of many bin systems, in the event multiple bins are employed. It is noted that while the count recorder 710 is shown coupled to the storage portion 708 at various locations, the count recorder can also take the form of a "pointer" that indicates a particular storage portion 708 location. In just one possible arrangement, the pointer can be incremented as voice data is stored, and reset once accumulated voice data is dumped.

The output control portion 712 is coupled to the storage portion 708 and enables the transmission of the currently stored voice data in response to a bin dump signal, shown as BINx_DMP.

The first embodiment 700 is also shown in FIG. 7 to include a bin monitor 714. The bin monitor 714 of FIG. 2 is shown to receives the bin count value BINx_CNT value and an output line speed value (shown as LIN_SPD), and in response to these values, generates the bin dump signal BINx_DMP. The line speed value LIN_SPD provides an indication of how fast data can be output after being dumped from a bin system. This, in combination with the bin dump signal BINx_DMP, can be used to establish how much time (transport latency, TRANSx_LAT) will be required to transmit the currently stored voice data. When the transport latency value TRANSx_LAT is equal to a predetermined maximum latency, the bin dump signal BINx_DMP can be activated. Such an approach can help to ensure that accumulated voice data will be transmitted with sufficient time to prevent the voice data from exceeding the maximum latency. At the same time, the approach can allow voice channel data to be accumulated, and thereby makes more available use of outgoing bandwidth.

In this way, the second embodiment 700 provides "dynamic" transmission of accumulated multiple voice channel data according to outgoing bandwidth capabilities and current quantity of voice data. This is in contrast to the approach set forth in FIG. 3, which can transmit data according to periodic time signals, and/or when accumulated voice data reaches a predetermined amount.

It is noted that the second embodiment 700 may be considered as being optimized for a "hardware" implementation. That is, the various constituents could form portions of one or a limited number of integrated circuits. In such an implementation, the bin system 702 could include an integrated memory structure, and the bin monitor 714 could include conventional logic circuits. However, the first embodiment 700 should not be construed as being limited to such a particular implementation. As just one example, while not as compact or cost effective as a hardware implementation only approach, an alternate implementation could one or more system components. As just one example, the storage portion could be one portion of a dedicated RAM or a system RAM. In such a case, the counter could be a pointer, a series of programmed instructions executed by a processor, or some combination thereof. Further, bin monitor could also be a series of programmed instructions that read the bin count values from a register or the like.

Figure 8:
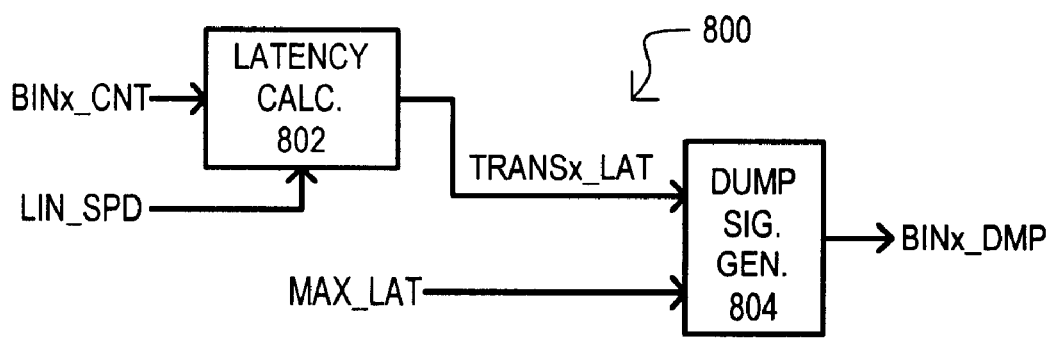
FIG. 8 is a block diagram of a bin monitor that may be used in the second embodiment.

Referring now to FIG. 8, a bin monitor that may be used in the third embodiment 700 is set forth in block diagram, and designated by the general reference character 800. The bin monitor 800 can receive a bin count value BINx_CNT from a storage device that accumulates voice data from multiple channels, and a line speed value LIN_SPD that indicates the rate at which accumulated voice data can be transmitted. The second embodiment 800 can also receive a maximum latency value (MAX_LAT) that indicates a maximum acceptable latency for the transmission of voice data. In response to the various values, the second embodiment 800 provides a bin dump signal BINx_DMP that enables voice data to be transmitted when activated.

The bin monitor 800 is shown to include a latency calculator 802 and a dump signal generator 804. The latency calculator 802 receives the bin count value BINx_CNT and the line speed value LIN_SPD and generates a transport latency value TRANSx_LAT therefrom. For example, for a given line speed value LIN_SPD, as the bin count value BINx_CNT increases (indicating the accumulation of more and more voice data) the transport latency value TRANSx_LAT will fall. Conversely, for a given bin count value BINx_CNT, if a greater line speed LIN_SPD is available, the transport latency value TRANSx_LAT will increase.

Referring yet again to FIG. 8, the transport latency value TRANSx_LAT and the maximum latency value MAX_LAT can be received by the dump signal generator 804. The dump signal generator 804 utilizes the MAX_LAT and TRANSx_LAT values to activate the bin dump signal BINx_DMP. For example, if the transport latency value TRANSx_LAT approaches or is going to exceed the maximum allowable latency, the dump signal BINx_DMP can be activated. Voice data may then be output from a bin in time to avoid exceeding the maximum allowable latency. It is understood that maximum allowable latency value MAX_LAT can be user programmable, and therefore be optimized for particular applications or available network resources.

In this way, the bin monitor 800 utilizes an indication of how much voice data is currently stored (such as the BINx_CNT value) in conjunction with an available outgoing bandwidth (such as the LIN_SPD value) to trigger the output of data within a predetermined maximum allowable latency.

It is noted that the bin monitor 800, like the structure of FIG. 7, can be subject to variations in implementation. As just a few examples, the generation of the transport latency value TRANSx_LAT and/or the bin dump signal BINx_DMP can be performed by custom logic designs. Alternatively, one or both such values can be generated by a series of instructions executed by a processor.

Third Embodiment

Figure 9:
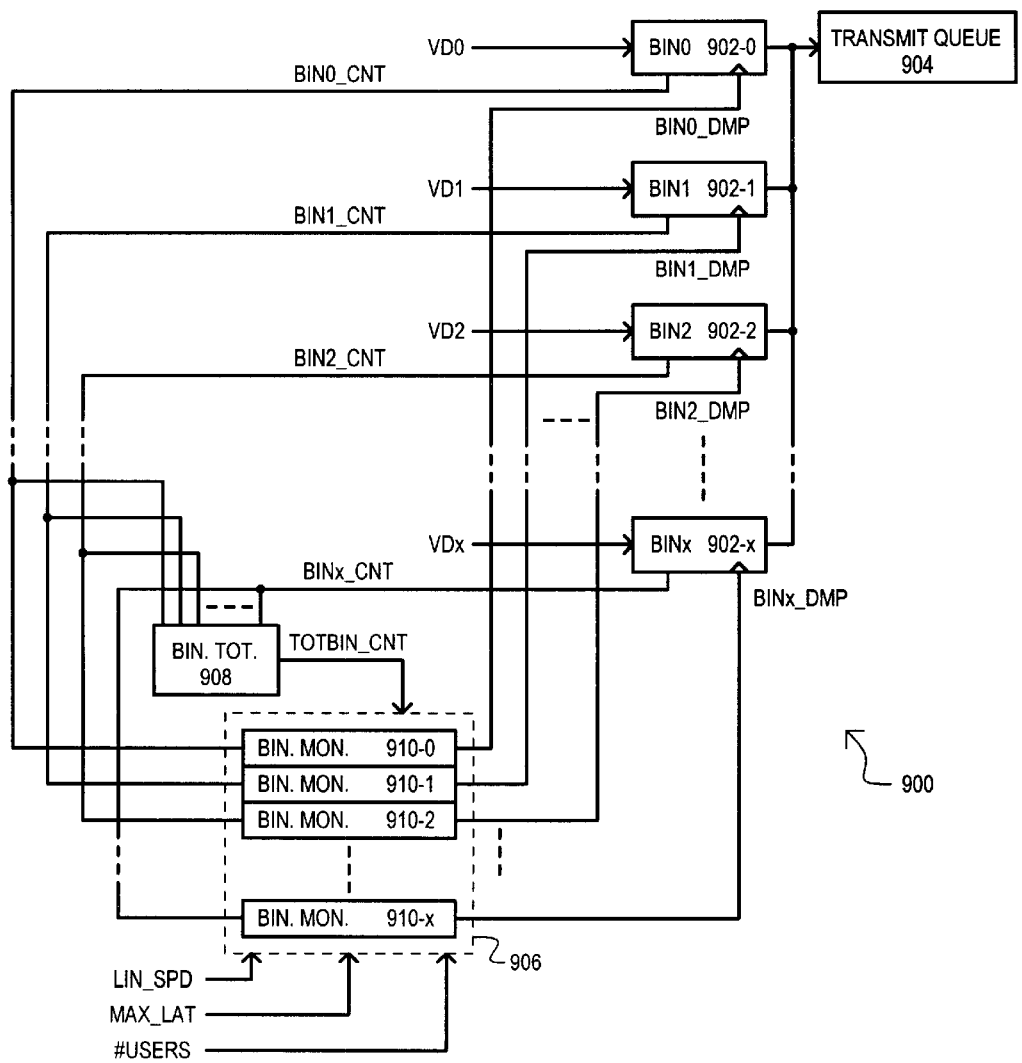
FIG. 9 is a block diagram of a third embodiment.

Referring now to FIG. 9, a block diagram is set forth illustrating a third embodiment that includes a multiple bin system. The third embodiment is designated by the general reference character 900, and includes "x+1" bin systems, shown as items 902-0 to 902-x. Each bin system (902-0 to 902-x) can receive voice data from a variety of different sources, and transmit accumulated voice data in response to a corresponding bin dump signal (BIN0_DMP to BINx_DMP). The bin systems (902-0 to 902-x) have outputs that are coupled to a transmit queue 904. The transmit queue 904 transmits data output from a selected bin system (902-0 to 902-x) to an output line.

In the arrangement of FIG. 9, each bin system (902-0 to 902-x) can also provides a corresponding bin count value (BIN0_CNT to BINx_CNT) which can indicate how much voice data is currently stored within the corresponding bin system (902-0 to 902-x). It is understood that while the bin systems (902-0 to 902-x) are shown separately in FIG. 9, such bin systems (902-0 to 902-x) can be arranged to share one large contiguous storage structure, with location pointers designating where particular bins begin and/or end.

In the third embodiment 900, bin count values (BIN0_CNT to BINx_CNT) are applied to a bin monitoring system 906 and to a bin value totaler 908. The bin value totaler 908 takes the individual counts for each bin system (902-0 to 902-x) and provides total bin count values TOTBIN_CNT, that can reflect some total or sub-total of bin count values (BIN0_CNT to BINx_CNT). As just one example, the TOTBIN_CNT values can essentially weight and sum latency values of all of the bins. Alternatively, the TOTBIN_CNT values can provide particular sub-totals according to a particular bin system transmit priority. For example, assume that the bin systems of FIG. 9 are to be transmitted according to the following priority, BIN1 902-1, BIN2 902-2, and then BIN0 902-0. In such a case, the bin totaler 908 could provide one total bin count value for BIN2 that follows from the latencies for those bin systems having a higher priority. Accordingly, the total bin count value for BIN2 would follow the transmit latency for BIN1 902-1, or BIN1_CNT. Similarly, the total bin count for BIN0 would follow the weighted sums of the transmit latencies for BIN_CNT and BIN2_CNT.

The bin monitoring system 906 of FIG. 9 is shown to include a number of bin monitors 910-0 to 910-x, each corresponding to bin systems 902-0 to 902-x, respectively. Each bin monitor (910-0 to 910-x) can receive an associated bin count signal (BIN0_CNT to BINx_CNT). In addition, each bin monitor (910-0 to 910-x) can receive a total bin count value TOTBIN_CNT from the bin totaler 908.

The bin monitoring system 906 is also shown to receive number-of-users values #USERS, maximum latency values MAX_LAT, and a line speed values LIN_SPD. The number-of-users values #USERS can include values that are particular to each bin system (902-0 to 902-x). Each particular number-of-users value can reflect how many different voice channels are currently stored within a given bin system (902-0 to 902-x).

The maximum latency values MAX_LAT can be one value applied to all bin monitors (910-0 to 910-x). Alternatively, maximum latency values MAX_LAT can be particular to each bin system (902-0 to 902-x), allowing the latencies for certain bin systems (902-0 to 902-x) to be shorter or longer than others.

The line speed values LIN_SPD can be a single line speed value reflecting at what rate data can be transmitted from the transmit queue 904 onto an output line. As just one example, the line speed values LIN_SPD can represent the maximum possible bit rate of a particular communication trunk or transmit media. It is understood that while a particular bin monitor is set forth in FIG. 8, the bin monitors (910-0 to 910-x) set forth in FIG. 9 are not limited to such an arrangement. Alternatively, the line speed values LIN_SPD can be different, if multiple output lines are available. Further, line speed values LIN_SPD may be variable in some applications.

Having described the general arrangement of the third embodiment 900, the operation the third embodiment 900 will now be described. In operation, voice channel data will arrive to each bin. The voice channel data can be grouped according to predetermined criteria, and voice channel data belonging to the same group can be input to the same bin system. As just one example, outgoing voice data may be grouped according to a common destination for the voice channel data. In this way, voice channel data destined for the same destination location can be commonly binned, and hence "multiplexed" together in a single transmitted packet. Voice channel data inputs for bin systems 902-0 to 902-x are shown as VD0 to VDx.

As voice channel data arrives and is stored in an appropriate bin system (902-0 to 902-x), bin count values (BIN0_CNT to BINx_CNT) begin to be generated and applied to the bin totaler 908 and bin monitoring system 906. The bin totaler 908 totals bin count values (BIN0_CNT to BINx_CNT) according to predetermined criteria, and supplies the values to the bin monitors (910-0 to 910-x). Each bin monitor (910-0 to 910-x) monitors how much voice data its bin system stores, the number of different users within its associated bin system, and the available outgoing bandwidth for the bin system. From these values, each bin monitor (910-0 to 910-x) determines how much time will be required to transmit the voice data of its particular bin system. As this time value comes within a predetermined range for the maximum latency value for the bin system, the bin monitor will activate its associated bin dump signal, causing its stored voice channel data to be output to the transmit queue.

It is noted that the particular arrangement of FIG. 9 provides dynamic dumping of multiple bin systems according to predetermined maximum latency values. In this way, voice data may be transmitted without falling below a given transmit rate, and the available bandwidth can be used more efficiently.

It is noted that in the third embodiment 900, a given bin monitor (910-0 to 910-x) may also activate its associated bin dump signal (BIN0_DMP to BINx_DMP) when the number of different voice channels (determined by the number-of-users values #USERS) is exceeded.

It is also noted that while the third embodiment 900 is shown to include a single transmit queue, multiple transmit queues could be used. In such a case, when a bin system (902-0 to 902-x) is coupled to such alternate transmit queue, such a bin system could have a different line speed values LIN_SPD.

In this way, the third embodiment 900 can monitor voice data accumulation rates of multiple bin systems (910-0 to 910-x) and transmit data from a bin system (910-0 to 910-x) to meet latency criteria, either common to all bins or particular to selected bins. This arrangement can allow voice data from multiple channels to be transmitted in groups within a defined latency period.

Figure 10:
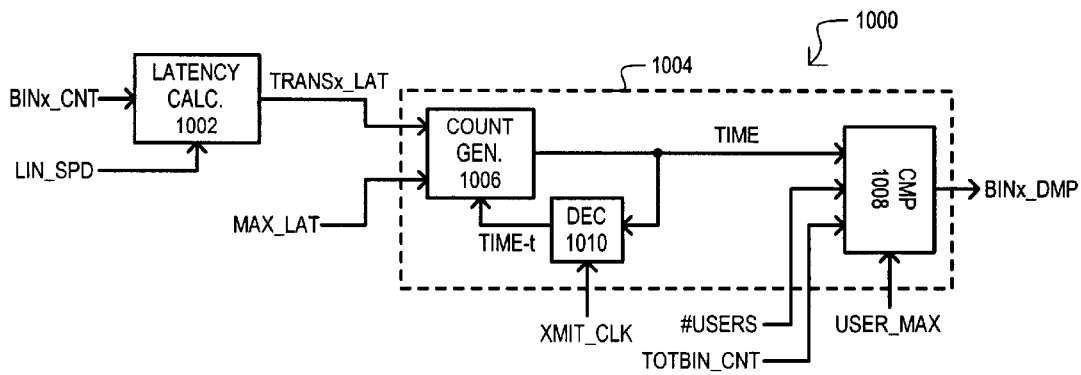
FIG. 10 is a block diagram of a bin monitor that may be used in the third embodiment.

Referring now to FIG. 10, a block schematic diagram is set forth illustrating a bin monitor that may be used in the third embodiment 900. The bin monitor 1000 may also be utilized in systems that have multiple bin systems for accumulating voice data and/or systems that provide a bin total value, representing the accumulation of voice data for multiple groups.

The bin monitor 1000 is shown to include a latency calculator 1002 and a dump signal generator 1004. The dump signal generator 1004 is shown to include a count generator 1006, a value compare portion 1008, and a decrementor 1010. The latency calculator 1002 receives a bin count value BINx_CNT and a line speed value LIN_SPD and generates a transport latency value TRANSx_LAT that varies in response thereto. The variation may be similar to that of the bin monitor 800, with the transport latency value TRANSx_LAT decreasing when the bin count value BINx_CNT increases and the line speed value LIN_SPD remains constant, and the TRANSx_LAT increasing when the line speed value LIN_SPD increases and the bin count value BINx_CNT remains constant.

In this way, the latency calculator 1002 generates a value that can indicate how long it may take the data accumulated in a particular bin system to be transmitted.

The transport latency value TRANSx_LAT, along with a maximum latency value MAX_LAT, are applied to the count generator 1006. The count generator 1006 generates a time value TIME from these inputs which indicates how much time is left before the transport latency value TRANSx_LAT will equal the maximum latency value MAX_LAT. Thus, the TIME value can be considered a value which indicates how much time remains before accumulated voice data must be transmitted in order to avoid exceeding the maximum latency value MAX_LAT.

The time value TIME is applied to the value compare portion 1008. The value compare portion 1008 is also shown to receive a number-of-users value #USERS, a total bin count value TOTBIN_CNT, and a maximum user value USER_MAX. The number-of-users value #USERS can represent how many different voice channels are currently stored within a bin system associated with the bin monitor 1000. The total bin count value TOTBIN_CNT can represent how much latency is required to transmit voice data accumulated in multiple bin systems. The maximum user value USER_MAX can represent a maximum user value number for a given bin system.

The value compare portion 1008 can compare its various input values, and in response to such comparisons, activate the bin dump signal BINx_DMP. As just one example, the time value TIME can be compared with a predetermined minimum value, and when the time value TIME is equal to the minimum value, the bin dump signal BINx_DMP is activated. The time value TIME can also be compared to the total bin count value TOTBIN_CNT, and in the event the TIME value approaches, or is equal to the TOTBIN_CNT value, the BINx_DMP signal can also be activated. Further, the number-of-users value #USER can be compared with the maximum user value USER_MAX, and when the #USER values equals the USER_MAX value, the BINx_DMP signal can be activated.

In this way, the value compare portion 1008 can receive a number of input values, including a time value TIME representing the amount of time remaining before accumulated voice data must be transmitted to avoid exceeding a given latency, and in response to such values, trigger the transmission of accumulated voice data. Additionally, a value compare portion 1008 can compare other values, such as number of users, amount of other voice data that may have a higher priority, and thereby trigger the transmission of accumulated voice data.

The decrementor 1010 of the bin monitor 1000 is shown to receive the time value TIME and provide a decremented time value TIME-t. The decrementor 1010 serves to reduce the time value TIME according to the rate at which voice data is being transmitted.

In the particular arrangement of FIG. 10, the decrementor 1010 decrements the time value TIME according to a transmit clock XMIT_CLK. Thus, the transmit clock XMIT_CLK represents the rate of outgoing data. The decremented time value TIME-t is fed back into the count generator 1006 as a new time value, and can function as the time value TIME on a subsequent cycle. It is understood that while the XMIT_CLK can be a constant value, it can also vary in the event a transmit queue provides a variable transmit rate and/or multiple output lines (trunks) having different bandwidths are utilized.

In this way, the bin monitor 1000 of FIG. 10 monitors the rate at which data is being transmitted to ensure that accumulated voice data is transmitted before a predetermined maximum latency. Dynamic dumping of multiple voice channel data can thus be accomplished.

Figure 11:
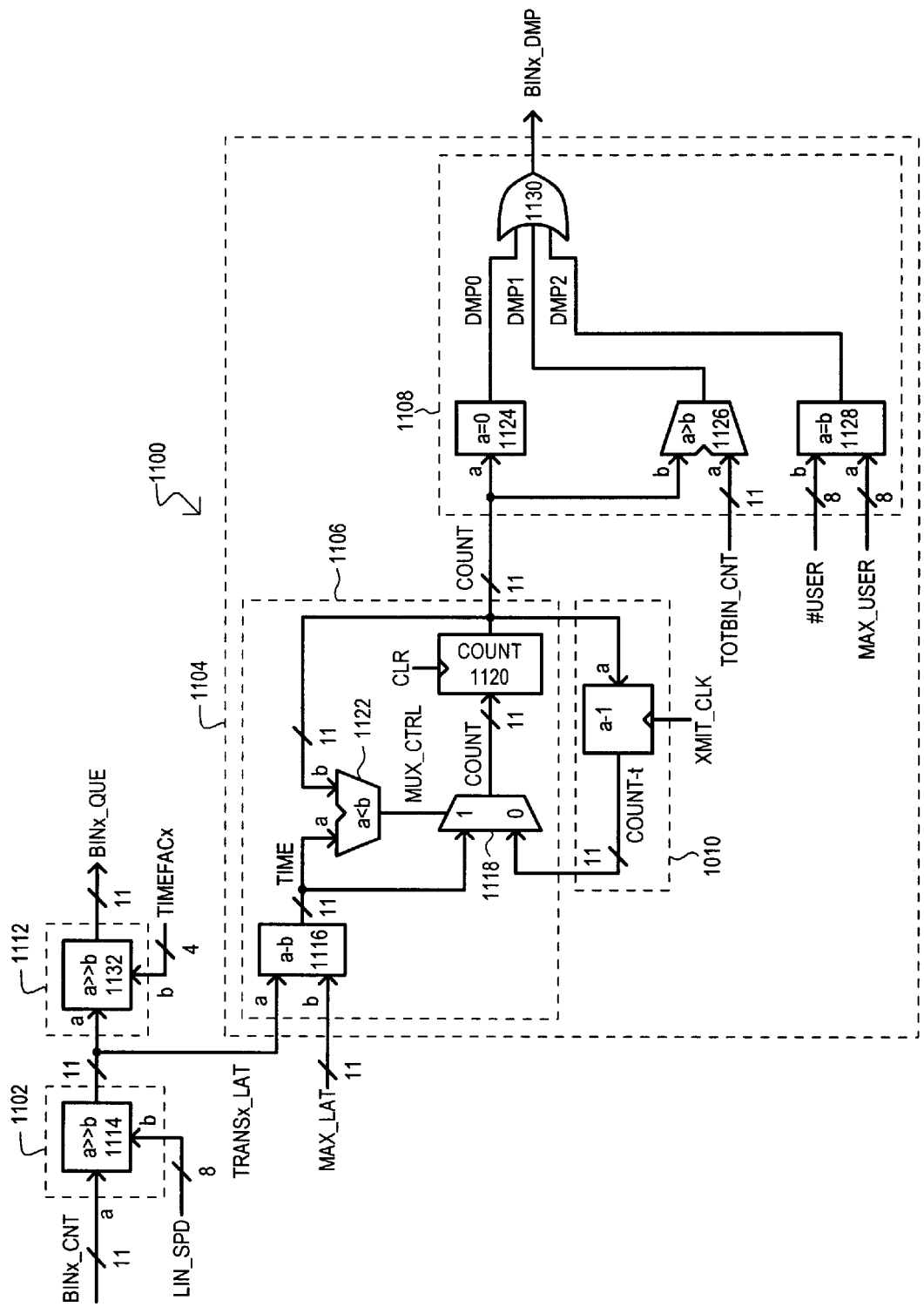
FIG. 11 is a schematic diagram of third bin monitor that may be used in the third embodiment.

Referring now to FIG. 11 a third bin monitor is set forth and designated by the general reference character 1100. The bin monitor 1100 is a schematic diagram of a bin monitor that may be used in conjunction with one or more bin systems, such as that set forth in FIG. 9. The bin monitor 1100 provides a bin dump signal BINx_DMP that can initiate the transmission of accumulated voice data from a bin system.

The bin monitor 1100 can be conceptualized as including a latency calculator 1102 and a dump signal generator 1104. The dump signal generator 1104 can be conceptualized as including a count generator 1106, value compare portion 1108, and a decrementor 1110. The bin monitor 1100 can also be considered to include a bin queue generator 1112.

The latency calculator 1102 can receive a bin count value BINx_CNT and a line speed value LIN_SPD. The bin count value BINx_CNT value can indicate how much voice channel data is accumulated in a storage device, such as a bin system, as previously described. For example, as voice channel data (voice data that can arise from multiple sources) is accumulated, the bin count value BINx_CNT will increase. Once the accumulated voice channel data is transmitted, the bin count value BINx_CNT will return to zero. The line speed value LIN_SPD indicates available rate at which accumulated voice channel data can be transmitted (bandwidth).

In the bin monitor 1100 of FIG. 11, the latency calculator 1102 can includes a divider 1114 that receives the bin count value BINx_CNT as a divisor and the LIN_SPD value as a dividend. Thus, in the particular arrangement of FIG. 11, the transport latency TRANSx_LAT is given by the following equation TRANSx_LAT=BINx_CNT/LIN_SPD.

As shown in FIG. 11, the bin count value BINx_CNT can be an 11-bit value and the line speed value LIN_SPD can be an 8-bit value. The resulting transport latency TRANSx_LAT can be an 11-bit value, as well. Of course, the particular bit widths of the various values represent one example of one limited implementation.

The transport latency value TRANSx_LAT is applied to the bin queue generator 1112 and the dump signal generator 1104. The particular dump signal generator 1104 of the bin monitor 1100 can include a subtractor 1116, a count multiplexer (MUX) 1118, a count register 1120, and a count comparator 1122. The subtractor 1116 can receive a maximum latency value MAX_LAT, and subtract the transport latency value TRANSx_LAT therefrom. The result can be a time value TIME representing how much time remains before stored voice channel data must be transmitted. Accordingly, in the particular arrangement of FIG. 11, the time value TIME is given by the following equation TIME =MAX_LAT−TRANSx_LAT.

In FIG. 11, the maximum latency value MAX_LAT and resulting time value TIME can be 11-bit values. As in the case of the various other previously mentioned values, particular data formats and sizes should not be construed as limiting to the invention.

The time value TIME can be applied to the count MUX 1118 as one input. The other input to the count MUX 1118 can be a decremented count value COUNT-t. It is noted that when voice data first arrives to a bin system, the resulting TRANSx_LAT value can be passed through the count MUX 1118 as a count value COUNT. Following the initial generation of a COUNT value, the count MUX 1118 will pass either the time value TIME or the decremented count value COUNT-t according to a MUX control signal MUX_CTRL. The MUX_CTRL signal can be generated by the count comparator 1122.

The count value COUNT can be stored in the count register 1120 and provided to the count comparator 1122, the value compare portion 1108, and the decrementor 1110. The count register 1120 may also receives a clear signal CLR. The clear signal CLR resets the count value COUNT stored within the count register 1120 to zero once data is transmitted from an associated bin system (e.g., when the BINx_CNT signal is activated).

The decrementor 1110 can receive the COUNT value, and decrement the value to generate the decremented count value COUNT-t. The COUNT value provided by the count register 1120 can be decremented according to a transmit clock XMIT_CLK, which can represent the rate at which data is transmitted. The decremented count value COUNT-t is applied as an input to the count MUX 1118. In the particular arrangement of FIG. 11, the COUNT value is decremented by one, thus decremented count value is given by COUNT-t=COUNT−1.

This can indicates that the data units used by the bin count value BINx_CNT are the same as the data units that are transmitted every clock cycle. As just one example, if the COUNT value represents a number of bytes, one byte would be transmitted from a bin system per each transmit clock cycle XMIT_CLK. Of course, if the bin count value BINx_CNT is in units that differ from those used to transmit data, the count value will be decremented by a larger or smaller number, accordingly.

The time value TIME and count value COUNT are applied as inputs to the count comparator 1122. In the particular arrangement of FIG. 11, the count comparator 1122 compares the magnitude of the time value TIME to that of the count value COUNT. According to this comparison, the count comparator 1122 will drive the MUX control signal MUX_CTRL to one logic value or another. In particular, when the time value TIME is greater than the count value COUNT, the MUX_CTRL signal will be driven to a logic low, resulting in the decremented count value COUNT-t being output from count MUX 1118 as the new count value COUNT. Conversely, when the time value TIME is less than the count value COUNT, the MUX_CTRL signal will be driven to a logic high, resulting in the time value TIME being output from count MUX 1118 as the new count value COUNT.

Such an arrangement can takes into account the arrival of more and more voice channel data to a bin system. As just one example, if an initial amount of voice data is stored in a bin system an initial count value will be generated. The initial count value can then decremented until it is time to transmit the data. However, if additional voice data arrives, the count must be lowered, as more time will be required to transmit the additional voice data. The lowering of the count is accomplished by the count MUX 1118 passing on the newly generated TIME value as the count value COUNT, rather than the decremented count value COUNT-t.

Within the value compare portion 1108, the count value COUNT is applied to a low range comparator 1124 and a total count comparator 1126. In addition, the value compare portion 1108 also receives a number-of-users value #USER and maximum number of users value USER_MAX, and applies these values to a user comparator 1128. The low range comparator 1124 can provide an activating output DMP0 when the count value COUNT is equal to a predetermined value. In the particular arrangement of FIG. 11, the predetermined value is zero. Thus, the output DMP0 will be activated when the count value COUNT equals zero.

The total count comparator 1126 compares the count value COUNT with a total bin count value TOTBIN_CNT. The total bin count value TOTBIN_CNT can represent the latency involved in transmitting the data stored in other bin systems. In the particular arrangement of FIG. 11, when the count value COUNT is less than the total bin count value TOTBIN_CNT, an output DMP1 can be activated. In this way, accumulated voice channel data that is, or will be placed in a transmit queue ahead of monitored bin system is taken into account in generating the bin dump signal BINx_DMP.

The user comparator 1128 can receive number-of-users value #USERS and the maximum number of users value USER_MAX, and activate an output signal DMP2 when the values are equal. In this way, if the number of different voice channels stored within a bin system monitored by the bin monitor 1100 equals a maximum value, the bin dump signal BINx_DMP can be activated. This arrangement can allow a more effective distribution of voice channel data over an output line, by preventing some large accumulations of voice data in a particular bin system. It is noted that once a bin system is dumped, the corresponding number-of-users value #USERS can be reset to zero.

In the particular bin monitor 1100 illustrated, the total bin count value TOTBIN_CNT may be an 11-bit value. The number-of-users value #USERS and the maximum number of users value USER MAX may be 8-bit values. Of course, such particular formats and sizes should not be construed as limiting the invention to such an arrangement.

The various output signals DMP0, DMP1 and DMP2 from the comparators (1124, 1126 and 1128) are supplied as inputs to a dump signal activator 1130. The dump signal activator 1130 may receive signals from multiple sources, representing different bin system dump activation criteria, and in response thereto, activate the bin dump signal BINx_DMP. In the particular arrangement of FIG. 11 the dump signal activator 1130 is a logic OR gate. Other logic may be used as the dump signal activator 1130 according to how the activation of the bin dump signal BINx_DMP is to take place. The OR gate results in the BINx_DMP signal being activated when any of the output signals (DMP0, DMP1 or DMP2) are activated.

Referring yet again to FIG. 11 it is recalled that the transport latency value TRANSx_LAT can also applied to the bin queue generator 1112. The bin queue generator 1112 can also receive a timeout factor TIMEFACx. The timeout factor TIMEFACx, is a value that can indicate how close the monitored bin system is to "timing out" (transmitting its accumulated voice channel data). In the particular arrangement of FIG. 11, the timeout factor TIMEFACx can have values that begin at zero. The larger the timeout factor TIMEFACx, the further away a bin system is to timing out. Conversely, a timeout factor TIMEFACx of zero indicates that the bin system is very close to timing out. Utilizing the timeout factor TIMEFACx and the transport latency value TRANSx_LAT, the bin queue generator 1112 can generate a bin queue value BINx_QUE that represents a look ahead prediction on how long it will take for the monitored bin system to timeout, as compared with the other bin systems.

In the bin monitor 1100, the bin queue value BINx_QUE is generated utilizing a divider 1132. The divider utilizes the transport latency value TRANSx_LAT as a dividend and the timeout factor TIMEFACx as a dividend.

In the event the particular bin queue generator 1112 approach of FIG. 11 is used with an overall system employing multiple bin systems, the resulting bin queue values can be used to generate a total bin count value, such as TOTBIN_CNT set forth in FIG. 11. As just one possible example, a total bin count value may be given by the following relationship $$\text{TOTBIN\_CNT} = \sum_{0}^{x} \frac{TRANSx\text{-}LAT}{TIMEFACx}$$

It is understood that the bin 1100 represents one implementation that may be particularly suitable for implementation in one, or a small number integrated circuits. Such an implementation may provide for higher speed processing of accumulated voice data in bins. Further, such an approach could be much more cost effective than a larger CPU oriented system approach, as it does not necessarily need an instruction set, bin processing algorithm, and dedicated processor device.

Fourth Embodiment

It is understood that the teachings illustrated by the second embodiment 700 and third embodiment 900 could be implemented as a series of steps, executed by a processing device according to predetermined instructions. To illustrate such an approach, a fourth embodiment is set forth in a flow diagram in FIG. 12. However, while the fourth embodiment can be implemented with a processor and associated set of instructions, the embodiment may also be implemented in "hardware" (integrated circuit) form from the flow diagram. As just one of the many such forms, the flow diagram can be implemented in a higher level hardware design language (such as Verilog or VHDL, as just two examples) to design and eventually fabricate an integrated circuit or multiple integrated circuits having the desired functionality.

Figure 12:
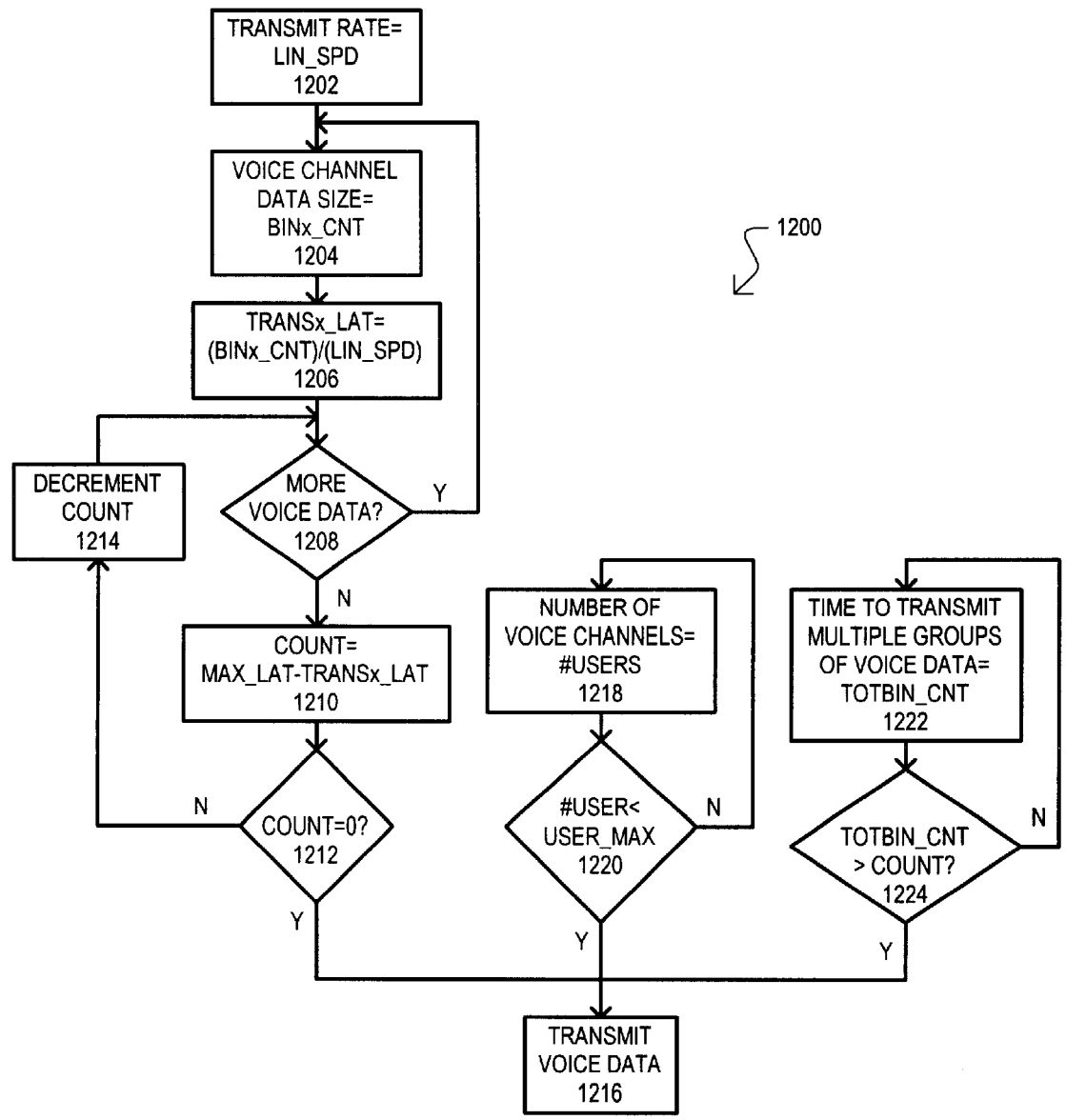
FIG. 12 is a flow diagram illustrating a fourth embodiment.

FIG. 12 sets forth a flow diagram according to a fourth embodiment 1200. The fourth embodiment 1200 includes a method for dynamically transmitting accumulated voice data from multiple sources (channels) within a designated latency period (a maximum latency). The fourth embodiment 1200 can include determining a transmit rate (shown as TRANSMIT RATE=LIN_SPD 1202). Such a step can include, as just one example, establishing a LIN_SPD value according to a particular transmission line. In particular, if the transmit line is a "T-1" trunk line, the LIN_SPD value could be given as 1.544 million-bits-per-second (Mbps). This value could be increased to account for additional voice data transmission delay introduced by other devices (such as a media interface or the like) that may be situated prior to the T-1 line.

The fourth embodiment 1200 can continue by determining the size of currently stored voice data from possible multiple sources (shown as VOICE CHANNEL DATA SIZE=BINx_CNT 1204). Voice data can be from multiple sources in that a number of users may place voice data on a network. The voice data from such multiple users may be commonly grouped at a storage location (bin). One possible way of determining the size of voice data is to maintain a "bin" count value for voice data stored at a common location. The BINx_CNT value can be in the same units used by the LIN_SPD value. As just one example, if the LIN_SPD value is in bits-per-second, the BINx_CNT value can be in bits.

A fourth embodiment 1200 can continue with the calculation of a transmit latency value from a line speed value and a voice data size value (shown as TRANSx_LAT=(BINx_CNT)/(LIN_SPD 1204)). In the particular arrangement of FIG. 12, the calculation involves dividing the BINx_CNT value by the LIN_SPD value. Such a particular division calculation can be accomplished by a processor circuit, or alternatively by hardware circuits that employ shifting to implement binary division by powers of two, to name just two possible examples. Of course, additional values can be added onto the resulting TRANSx_LAT value to account for other delays that might arise.

The fourth embodiment 800 is shown to further include determining when new voice data has arrived (shown as MORE VOICE DATA? 1200). In the event more voice data arrives at a bin, the method returns to step 1204 in order to calculate an updated TRANSx_LAT value based on a new BINx_CNT value. In the event no additional voice data has been received, the method can continue by generating a count value that represents how much time is left before the data must be transmitted in order to meet a maximum latency (shown as COUNT=MAX_LAT-TRANSx_LAT 1210). As noted by FIG. 12, in the fourth embodiment 1200, this can be accomplished by subtracting the TRANS_LAT value from a maximum latency value MAX_LAT. As in the case of previously mentioned values, a resulting COUNT value can be adjusted to represented other delays.

The generated COUNT value can then be compared to a minimum value (shown as COUNT=0? 1212). As shown by FIG. 12, in the fourth embodiment 1200, the COUNT value is compared to zero. In the event the COUNT value is not yet equal to zero (indicating that voice data does not yet need to transmitted), the count value is reduced (shown as DECREMENT COUNT 1214). In this way, the COUNT value may be decremented (according to the LIN_SPD value). As just one example, if accumulated voice data is to be transmitted on a T-1 trunk line, the COUNT value could be decremented at the 1.544 Mbps rate. The method can then return to step 1208. In the event the COUNT value is equal to zero (indicating that the voice data needs to transmitted in order stay within a maximum latency value), the accumulated voice data is transmitted (shown as TRANSMIT VOICE DATA 1216).

The method of FIG. 12 is shown to include a number of other concurrent loops. In particular, a first of the concurrent loops includes determining the number of different voice channels currently stored (shown as NUMBER OF VOICE CHANNELS=#USER 1218). Such a step can include, as just one example, maintaining a count of different voice channels that is updated when a voice data from a previously uncounted channel is received. The #USER value can then be compared with a maximum number of users value (shown as #USER<#USER_MAX 1220). Provided the #USER values does not exceed the #USER_MAX value, the method proceeds. However, if the #USER value exceeds the #USER_MAX value, the accumulated voice data will be transmitted.

In the particular arrangement of FIG. 12, the second concurrent loop is similar to the first concurrent loop. The second concurrent loop includes determining the time required to transmit multiple groups of data. Such a loop assumes that there are simultaneous methods, such as that set forth in FIG. 12, running for other groups of accumulated voice data. In such a case, the time required to transmit such other groups of accumulated voice data is determined (TIME TO TRANSMIT MULTIPLE GROUPS OF VOICE DATA=TOTBIN_CNT 1222). Provided the COUNT value remains less than the TOTBIN_CNT value, the method continues. However, if the COUNT value is less than the TOTBIN_CNT value, the accumulated voice data is transmitted (shown as TOTBIN_CNT>COUNT?).

It is understood that while the steps 1218/1220 and 1222/1224 are arranged to be executed concurrently with the remaining steps, it is understood that other implementations could place one or both of the concurrent loops in series with the other steps, as just one obvious variation.

It is understood that while the various particular embodiments set forth herein have been described in detail, the present invention could be subject to various changes, substitutions, and alterations without departing from the spirit and scope of the invention. Accordingly, the present invention is intended to be limited only as defined by the appended claims.

What is claimed is:

1. A method for grouping voice data samples from a variety of sources for common transmission in single data packets, comprising the steps of:
   storing voice data samples received from a plurality of sources in a number of channel memories with accompanying multiplexer header information;
   establishing bins for grouping voice data samples that can be stored in different channel memories, each bin having bin criteria; and
   transmitting from the bins multiplexed voice data packets that include a plurality of voice data samples and accompanying multiplexer header information for each voice data sample according to the bin criteria of the bins.

2. The method of claim 1, wherein:
   the step of storing voice data samples includes
   logically dividing a memory into portions, each portion forming a channel memory, and
   storing voice data samples from particular sources in predetermined channel memories.

3. The method of claim 1, wherein:
   the step of establishing bins includes generating a list for each bin that includes voice data sample information for the voice data samples of the bin, the voice data sample information including the address of the voice data sample.

4. The method of claim 3, wherein:
   the voice data sample information of each bin further includes the data sizes of the voice data samples of the bin; and
   each list can include a linked-list of address and data sizes for the voice data samples of its associated bin.

5. The method of claim 4, wherein:
   the step of storing voice data samples further includes
   storing voice data sample information in a queue,
   retrieving the voice data sample information from a queue, and
   appending a link list with the retrieved voice data sample information.

6. The method of claim 1, wherein:
   the step storing voice data samples includes
   buffering voice data samples in a buffer as they are received, and
   transferring received voice data samples to a channel memory having the accompanying multiplexer header information for the voice data sample.

7. A method of grouping received voice data samples for common transmission in a multiplexed network voice packet, the method comprising the steps of:
   forming bins that can group commonly transmitted voice data samples, each bin including a maximum bin size;
   receiving a new voice data sample;
   determining an efficiency value for selected bins, the efficiency value determined by the difference between how much voice data can be accumulated in the bin at an ideal rate before the maximum bin size is reached, and how much additional voice data can be accumulated in the bin before exceeding the maximum bin size, prior to the addition of the new voice channel to the bin;

determining a projected efficiency value for the selected bins, a projected efficiency value representing a comparison between the rate at which voice data is being accumulated for the bin after the addition of the new voice data sample and the ideal voice data accumulation rate; and adding the new voice data sample to the selected bins to maximize the efficiency for all bins.

8. The method of claim 7, wherein:

the step of determining a projected efficiency value for the selected bins includes determining the difference between how much voice data can be accumulated in the bin at an ideal rate before the maximum bin size is reached, and how much additional voice data can be accumulated in the bin before exceeding the maximum bin size, after the addition of the new voice channel to the bin.

9. The method of claim 8, wherein:

the ideal rate includes the maximum bin size divided by a maximum latency value.

10. The method of claim 7, wherein:

the step of determining an efficiency value for selected bins is given by the equation $$fj = \left| \frac{\Delta Tj}{\alpha} - \Delta Sj \right|$$

wherein fj is the efficiency value, $\Delta Tj$ is the time remaining before a maximum latency value is reached, $\alpha$ is Tmax/Smax, where Tmax is a maximum latency value and Smax is the maximum bin size, and $\Delta Sj$ is the amount of voice data that may be accumulated for exceeding the maximum bin size prior to the addition of the new voice data sample; and the step of determining a projected efficiency value for selected bins is given by the equation $$fjnew = \left| \frac{\Delta Tj}{\alpha} - \Delta Sjnew \right|$$

wherein fjnew is the projected efficiency value and $\Delta Sjnew$ is the amount of voice data that may be accumulated for exceeding the maximum bin size after the addition of the new voice data sample; and the step of adding the new voice data sample to the selected bins includes maximizing the equation $$\frac{fj - fjnew}{fj}$$

for all the selected bins.

11. The method of claim 7, further including:

determining the selected bins from all of the bins, the selected bins being those bins that can receive the new voice data sample without exceeding their respective maximum bin size.

12. The method of claim 11, wherein:

forming bins that can group voice data samples of the same multiplexed network voice packet, each bin including a maximum bin size value and maximum latency value;

increasing maximum bin size values and maximum latency values if data traffic on the network exceeds a predetermined value; and decreasing maximum bin size values and maximum latency values if data traffic on the network is below a predetermined value.

13. A method of grouping received voice data samples as defined in claim 7 where the steps of forming bins comprises:

forming bins that can group voice data samples of the same multiplexed network voice packet, each bin including a maximum bin size value and maximum latency value; and further comprising the steps of increasing maximum bin size values and maximum latency values if data traffic on the network exceeds a predetermined value; and decreasing maximum bin size values and maximum latency values if data traffic on the network is below a predetermined value.

14. The method of claim 13, further including:

increasing the maximum latency value of a bin if the bin is accumulating voice data samples at a rate that is less than an expected rate.

15. The method of claim 14, further including:

each bin further includes a base bin size value;

decreasing the maximum bin size value if the bin is accumulating voice data samples at an expected rate and the maximum bin size value is greater than the base bin size value; and increasing the maximum bin size value if the bin is accumulating voice data samples at an expected rate and the maximum bin size value is less than the base bin size value.

16. The method of claim 14, further including:

each bin further includes a base latency value;

decreasing the maximum latency value if the bin is accumulating voice data samples at an expected rate and the maximum latency value is greater than the base latency value; and increasing the maximum latency value if the bin is accumulating voice data samples at an expected rate and the maximum latency value is less than the base latency value.

17. A system, comprising:

a storage device for receiving and storing multiplexed voice data samples from a plurality of sources with included multiplexer headers;

a plurality of bin information stores that store information for a voice data sample group; and at least one processor device including means for generating a list of voice data samples for each group that can allow the voice data samples of the group to be read sequentially from the storage device and means for transmitting from the bins according to a bin criteria multiplexed voice data packets that include a plurality of voice data samples and accompanying multiplexer header information for each voice data sample.

18. The system of claim 17, wherein:

the storage device includes a static random access memory having addressable locations that are logically divided into the plurality of memory sections.

19. The system of claim 17, wherein:

the system includes a plurality of first processors coupled to a first network structure and a second processors coupled to a second network structure;

the first processors storing voice data samples received from the first network structure in associated voice channel memories; and the second processors generating lists that include a plurality of voice data samples from the various voice channel memories.

* * * * *